(12) United States Patent
Barker et al.

(10) Patent No.: US 10,635,829 B1
(45) Date of Patent: Apr. 28, 2020

(54) METHOD AND SYSTEM FOR GRANTING PERMISSIONS TO PARTIES WITHIN AN ORGANIZATION

(71) Applicant: Intuit Inc., Mountain View, CA (US)

(72) Inventors: Xiaoyan Cindy Barker, San Diego, CA (US); Yi Zhang, San Diego, CA (US); Shankar A. Chittoor, Pleasanton, CA (US)

(73) Assignee: Intuit Inc., Mountain View, CA (US)

( * ) Notice: Subject to any disclaimer, the term of this patent is extended or adjusted under 35 U.S.C. 154(b) by 245 days.

(21) Appl. No.: 15/824,739

(22) Filed: Nov. 28, 2017

(51) Int. Cl.
*G06F 21/62* (2013.01)
*H04L 29/06* (2006.01)
*G06F 21/60* (2013.01)
*H04L 29/08* (2006.01)
*G06F 11/34* (2006.01)

(52) U.S. Cl.
CPC .......... *G06F 21/6218* (2013.01); *G06F 11/34* (2013.01); *G06F 21/604* (2013.01); *H04L 63/102* (2013.01); *H04L 63/104* (2013.01); *H04L 67/22* (2013.01)

(58) Field of Classification Search
CPC .... G06F 21/6218; G06F 11/34; G06F 21/604; H04L 63/102; H04L 63/104; H04L 63/04; H04L 67/22
See application file for complete search history.

(56) References Cited

U.S. PATENT DOCUMENTS

| | | |
|---|---|---|
| 5,003,596 A | 3/1991 | Wood |
| 6,157,723 A | 12/2000 | Schultz |
| 6,324,648 B1 | 11/2001 | Grantges, Jr. |
| 6,889,210 B1 | 5/2005 | Vainstein |
| 6,981,041 B2 | 12/2005 | Araujo et al. |
| 6,996,716 B1 | 2/2006 | Hsu |
| 7,178,033 B1 | 2/2007 | Garcia |

(Continued)

FOREIGN PATENT DOCUMENTS

| | | |
|---|---|---|
| EP | 0906677 | 1/1998 |
| EP | 1501256 | 1/2005 |

(Continued)

OTHER PUBLICATIONS

Tokuyoshi, "Encryption: Getting a Grip on Key Rotation", Apr. 23, 2009, pp. 1-3. Retrieved from the internet. <http://www.cio.com/article/2428777/security0/encryption--getting-a-grip-on-key-rotation.html>.

(Continued)

*Primary Examiner* — Yonas A Bayou
(74) *Attorney, Agent, or Firm* — Paradice and Li LLP

(57) ABSTRACT

Artificial intelligence, big data, and crowd sourcing techniques are utilized to efficiently and effectively determine permissions that should be granted to a party within an organization. In one example, the permissions granted to a party within an organization are determined using one or more algorithms to identify, weight, and correlate historical and current permissions to party attributes for parties within the organization and/or for similar parties in similar organizations. In one example, the activity of the party within the organization is then monitored and the permissions granted the party are automatically modified as needed to allow the party to perform their tasks in the organization as the party's responsibilities within the organization evolve.

46 Claims, 4 Drawing Sheets

(56) References Cited

U.S. PATENT DOCUMENTS

| | | | |
|---|---|---|---|
| 7,336,790 B1 | 2/2008 | Caronni et al. | |
| 7,360,075 B2 | 4/2008 | VanHeyningen et al. | |
| 7,380,120 B1* | 5/2008 | Garcia ................. | G06F 21/6209 |
| | | | 713/160 |
| 7,434,045 B1 | 10/2008 | Enderwick et al. | |
| 7,546,629 B2 | 6/2009 | Albert et al. | |
| 7,568,235 B2 | 7/2009 | Bird et al. | |
| 7,715,565 B2 | 5/2010 | Kimmel et al. | |
| 7,739,501 B2 | 6/2010 | Kimmel et al. | |
| 7,890,530 B2 | 2/2011 | Bilger et al. | |
| 7,983,423 B1 | 7/2011 | Agarwal et al. | |
| 7,984,025 B2 | 7/2011 | Valfridsson et al. | |
| 8,095,960 B2 | 1/2012 | Boogert et al. | |
| 8,316,237 B1 | 11/2012 | Felsher et al. | |
| 8,352,999 B1 | 1/2013 | Zhan et al. | |
| 8,498,941 B2 | 7/2013 | Felsher | |
| 8,560,857 B2 | 10/2013 | Munetoh et al. | |
| 8,656,189 B2 | 2/2014 | Orsini et al. | |
| 8,700,898 B1 | 4/2014 | Korthny et al. | |
| 8,700,906 B2 | 4/2014 | Kamara et al. | |
| 8,826,013 B1 | 9/2014 | Kodukula et al. | |
| 8,880,882 B1 | 11/2014 | Kulkarni et al. | |
| 9,282,122 B2 | 3/2016 | Cabrera et al. | |
| 9,378,380 B1* | 6/2016 | Reid ..................... | G06F 21/6218 |
| 9,384,362 B2 | 7/2016 | Cabrera et al. | |
| 9,396,338 B2 | 7/2016 | Cabrera et al. | |
| 9,444,818 B2 | 9/2016 | Lietz et al. | |
| 9,467,477 B2 | 10/2016 | Cabrera et al. | |
| 9,785,798 B1* | 10/2017 | Enderwick ........... | G06F 16/2455 |
| 9,894,069 B2 | 2/2018 | Weaver et al. | |
| 9,900,330 B1* | 2/2018 | Dargude ............. | H04L 63/1425 |
| 10,095,885 B1* | 10/2018 | Enderwick .......... | G06F 16/2455 |
| 2002/0023065 A1 | 2/2002 | Frelechoux et al. | |
| 2003/0200202 A1 | 10/2003 | Hsiao et al. | |
| 2004/0210591 A1 | 10/2004 | Hirschfeld et al. | |
| 2005/0138110 A1 | 6/2005 | Redlich et al. | |
| 2006/0062238 A1 | 3/2006 | Mahendran et al. | |
| 2006/0215839 A1 | 9/2006 | Augenstein et al. | |
| 2006/0291664 A1 | 12/2006 | Suarez et al. | |
| 2007/0156781 A1 | 7/2007 | Kapoor et al. | |
| 2007/0195960 A1 | 8/2007 | Golman et al. | |
| 2007/0276931 A1 | 11/2007 | Mahdavi et al. | |
| 2008/0013569 A1 | 1/2008 | Boren | |
| 2008/0072309 A1 | 3/2008 | Kleinsteiber et al. | |
| 2008/0083036 A1 | 4/2008 | Ozzie et al. | |
| 2008/0098392 A1 | 4/2008 | Wipfel et al. | |
| 2008/0109491 A1 | 5/2008 | Gupta | |
| 2008/0155649 A1 | 6/2008 | Maler et al. | |
| 2008/0319909 A1 | 12/2008 | Perkins et al. | |
| 2009/0092252 A1 | 4/2009 | Noll et al. | |
| 2009/0103724 A1 | 4/2009 | Tamai | |
| 2009/0204631 A1 | 8/2009 | Pomroy et al. | |
| 2009/0287837 A1 | 11/2009 | Felsher | |
| 2009/0319772 A1 | 12/2009 | Singh et al. | |
| 2010/0082991 A1 | 4/2010 | Baldwin et al. | |
| 2010/0145997 A1* | 6/2010 | Zur ..................... | G06F 21/6218 |
| | | | 707/783 |
| 2010/0146600 A1 | 6/2010 | Eldar et al. | |
| 2010/0189251 A1 | 7/2010 | Curren | |
| 2011/0004752 A1 | 1/2011 | Shukla | |
| 2011/0022642 A1 | 1/2011 | deMilo et al. | |
| 2011/0022812 A1 | 1/2011 | van der Linden et al. | |
| 2011/0093707 A1 | 4/2011 | Green et al. | |
| 2011/0113236 A1 | 5/2011 | Chenard et al. | |
| 2011/0158406 A1 | 6/2011 | Marcia et al. | |
| 2011/0188651 A1 | 8/2011 | Iswandhi et al. | |
| 2011/0191595 A1 | 8/2011 | Damian et al. | |
| 2011/0219035 A1 | 9/2011 | Korsunsky et al. | |
| 2011/0277027 A1 | 11/2011 | Hayton et al. | |
| 2012/0096281 A1 | 4/2012 | Eszenyi et al. | |
| 2012/0131189 A1 | 5/2012 | Smart et al. | |
| 2012/0185913 A1 | 7/2012 | Martinez et al. | |
| 2012/0204032 A1 | 8/2012 | Wilkins et al. | |
| 2012/0240194 A1* | 9/2012 | Nack Ngue ........... | G06F 21/604 |
| | | | 726/4 |
| 2012/0303776 A1 | 11/2012 | Ferris | |
| 2012/0304311 A1 | 11/2012 | Kline et al. | |
| 2012/0311564 A1 | 12/2012 | Khalid | |
| 2013/0019284 A1 | 1/2013 | Pacyga et al. | |
| 2013/0038673 A1* | 2/2013 | Hiller .................... | G06Q 10/06 |
| | | | 348/14.07 |
| 2013/0060825 A1 | 3/2013 | Farcasiu et al. | |
| 2013/0097706 A1 | 4/2013 | Titonis et al. | |
| 2013/0104213 A1 | 4/2013 | Nandakumar | |
| 2013/0125247 A1 | 5/2013 | Sprague et al. | |
| 2013/0185784 A1 | 7/2013 | Tamura | |
| 2013/0204849 A1 | 8/2013 | Chacko | |
| 2013/0219456 A1 | 8/2013 | Sharma et al. | |
| 2013/0247144 A1 | 9/2013 | Marshall et al. | |
| 2013/0254539 A1 | 9/2013 | Auradkar et al. | |
| 2013/0346558 A1 | 12/2013 | Khalidi et al. | |
| 2014/0007178 A1 | 1/2014 | Gillum et al. | |
| 2014/0007239 A1 | 1/2014 | Sharpe et al. | |
| 2014/0026179 A1 | 1/2014 | Devarajan et al. | |
| 2014/0026193 A1 | 1/2014 | Saxman et al. | |
| 2014/0068732 A1 | 3/2014 | Hinton et al. | |
| 2014/0074637 A1 | 3/2014 | Hammad | |
| 2014/0075499 A1 | 3/2014 | Arun et al. | |
| 2014/0165134 A1 | 6/2014 | Goldschlag et al. | |
| 2014/0173699 A1* | 6/2014 | Daly .................... | H04L 63/104 |
| | | | 726/4 |
| 2014/0244585 A1 | 8/2014 | Sivasubramanian et al. | |
| 2014/0282840 A1 | 9/2014 | Guinan | |
| 2014/0283010 A1 | 9/2014 | Rutkowski et al. | |
| 2014/0330869 A1 | 11/2014 | Factor et al. | |
| 2015/0256557 A1* | 9/2015 | Wong ..................... | H04L 63/20 |
| | | | 726/6 |
| 2015/0263859 A1 | 9/2015 | Lietz et al. | |
| 2015/0295916 A1 | 10/2015 | Sanso et al. | |
| 2015/0310221 A1 | 10/2015 | Lietz et al. | |
| 2016/0119444 A1* | 4/2016 | Pinkovezky .......... | H04L 67/306 |
| | | | 709/204 |
| 2016/0307208 A1* | 10/2016 | Dandekar ............ | G06Q 30/0201 |
| 2016/0352741 A1 | 12/2016 | Caffary | |
| 2017/0359352 A1* | 12/2017 | Ainscow .............. | H04L 63/102 |

FOREIGN PATENT DOCUMENTS

| | | |
|---|---|---|
| EP | 2469753 | 6/2012 |
| EP | 2645673 | 10/2013 |
| GB | 2477682 | 11/2009 |
| GB | 2524632 | 1/2015 |
| WO | WO 2010/144735 | 12/2010 |
| WO | WO 2013/144497 | 10/2013 |

OTHER PUBLICATIONS

Zao, et al.; "Domain Based Internet Security Policy Management;" DARPA Information Survivability Conference and Exposition, 2000 Proceedings; Jan. 25-27, 2000; IEEE.

Reddy et al., "Security Architecture of Cloud Computing," *International Journal of Engineering Science and Technology* (*IJEST*), vol. 3, No. 9, Sep. 9, 2011, pp. 7149-7155.

* cited by examiner

METHOD AND SYSTEM FOR GRANTING PERMISSIONS TO PARTIES WITHIN AN ORGANIZATION

BACKGROUND

Almost any organization, such as a small business, having multiple associated parties performing tasks and operating within the organization, such as employees, needs to control and monitor the types of activities in which the associated parties engage. Typically, control of the activities of associated parties within an organization is achieved by assigning various permissions to the associated parties within the organization.

Some examples of permissions that can be granted a given associated party in an organization include, but are not limited to: access to data and control of the types of data to which the party is provided access; the capability to perform various actions or tasks within the organization; access to the data management and other applications used by the organization; the level of review required for various tasks and actions taken by the associated party; the capability and limits on the associated party to act as an agent for the organization; the capability and limits on the associated party to incur debt, or other liability, for the organization; the capability and limits on the associated party to pay bills for the organization; the capability and limits on the associated party to deal with, i.e., handle, cash; the capability and limits on the associated party to generate and sign agreements or otherwise represent the organization; spending, transaction, or requisition limits imposed on the associated party for transactions involving the organization; types of work the associated party can perform for the organization; types of clients the associated party can service, access, or interact with on behalf of the organization; specific clients or vendors of the organization to which the associated party is provided access; the level of independence of operation afforded to the associated party within the organization; and/or any other of the numerous forms of permissions and responsibilities assigned to a given associated party within an organization so that the activities of the associated party can be controlled.

Currently, the permissions granted to parties associated with an organization are typically determined based, consciously or unconsciously, and systematically or in an ad hoc manner, on several trust or competency factors and/or attributes associated with the parties. These trust or competency factors/party attributes typically include, but are not limited to, one of more of: the job description assigned to the associated party by, or within, the organization; how long the associated party has been with the organization; the performance level of the associated party within the organization; the associated party's employment history and historical special permission grants; and various other trust or competency factors/party attributes whether specifically identified and utilized or not.

One long standing technical problem associated with many prior art permissions granting methods is that, despite the fact that in the prior art permissions are often based on identifiable trust or competency factors/associated party attributes, many organizations, such as small businesses, lack any systematic, or in some cases even objectively logical, policy for identifying, weighting, and/or applying trust or competency factors/associated party attributes. Consequently, it can difficult, if not nearly impossible, to ensure permissions granted within the organization are granted safely, consistently, logically, and in accordance with the risk tolerance of the organization.

This current lack of consistency in the granting of permissions within organizations arises largely because currently there is no efficient mechanism for monitoring permissions granted to parties within an organization and logically comparing responsibilities of parties within the organization with the permissions granted those parties and with the risk tolerance of the organization. In addition, currently, there is no efficient and effective mechanism for determining permissions granted to various similar parties in similarly situated organizations. Consequently, there is currently no mechanism for comparing responsibilities and permissions of parties associated with the organization with the responsibilities and permissions granted similar parties in similar organizations.

In short, currently, it is often the case that for a given organization, there is no efficient and effective way to consistently determine and apply permissions based on either the permissions currently and historically granted to associated parties within the organization or with the permissions currently and historically granted to similar parties in similarly situated organizations. The result is inefficient, and often inconsistent, permission granting schemes that are, at best, arbitrary and are often illogical, unmanageable, and completely unrelated to, or out of sync with, the risk tolerance of the organization. This, in turn, can create significant liabilities and operational huddles for the organization.

In addition, currently, even in cases where permissions are granted in a relatively consistent way based on identified trust and competency factors/associated party attributes, the permissions granted a given associated party are very likely to be changed as the associated party grows and advances within the organization, or is otherwise tasked with different responsibilities within the organization. In addition, some associated parties will emerge as special cases needing associated special permissions to perform their tasks. However, currently, even relatively consistently applied permissions programs are often static and, at best, require manual monitoring and updates to the permissions and/or special permission grants on a transaction/action-by-transaction/action basis. As a result, currently, significant time and resources of an organization are often utilized just to keep the permissions associated with a given associated party within an organization up-to-date.

The situation described above is problematic enough for a relatively static organization. However, in situations where the organization is growing, and/or has high associated party turnover, it becomes unwieldly, and incredibly inefficient and resource draining, to ensure each of the parties in the organization has the permissions they need to perform their tasks and effectively operate within the organization, while at the same time protecting the organization from mistakes, malfeasance, and/or other liabilities. Consequently, there is a long standing technical need for a method and system to efficiently and effectively provide permissions to parties in an organization in a logical and consistent way and then logically and systematically evolve the permissions granted to an associated party in response to the associated party's activity within the organization.

SUMMARY

Embodiments of the present disclosure use artificial intelligence and big data techniques to efficiently and effectively provide a method and system for systematically and consistently determining permissions that should be granted to a party within organization and then monitoring and adjusting those permissions as needed to allow the party to perform their tasks in the organization as the party's activities within the organization evolve.

In one embodiment, historical and current permissions granted to parties associated with an organization, such as employees of the organization, are identified and correlated to attributes of the associated parties, such as length of employment, skill sets, and employment records. In one embodiment, data representing the permissions to attribute correlations is processed using one or more algorithms and/or artificial intelligence methods to weight, rank, or otherwise indicate preference for, the various represented permissions to attribute correlations in accordance with the desires, indicated preferences, and risk tolerance of the organization.

In one embodiment, when a given associated party, such as a new employee, is brought into the organization, attributes associated with the given associated party are identified and matched to permissions granted to similarly situated associated parties within the organization. In one embodiment, the identified permissions are then submitted for review/approval and, when approved, granted to the given associated party.

In one embodiment, the activities and attributes of the given associated party, the permissions granted to similarly situated associated parties within the organization, and any exceptions/special permissions and/or case-by case exceptions granted to the given associated party, or similarly situated parties, are then monitored and processed so that when a need to modify the permissions granted to the given associated party is identified, modified permissions for the given associated party are generated, proposed, and, in one embodiment, submitted for review/approval. In one embodiment, when approved, the modified permissions for the given associated party are granted to the given associated party.

In addition, in one embodiment, historical and current permissions granted to similar parties associated with similar organizations, such as employees of an organization similarly situated to, or in competition with, the organization, are identified and correlated to attributes of the similar parties, such as length of employment, skill sets, and employment records. In addition, in one embodiment, data representing the permissions to attribute correlations for the similar parties is processed using one or more algorithms and or artificial intelligence methods to weight, rank, or otherwise indicate preference for, the various represented permissions to attribute correlations for the similar parties in accordance with the desires, indicated preferences, and risk tolerance of the organization.

In one embodiment, when a given associated party, such as a new employee, is brought into the organization, attributes associated with the given associated party are identified and matched to the permissions granted to similarly situated associated parties within the organization and/or permissions granted to the similar parties of the similarly situated organizations. In one embodiment, the identified permissions are then submitted for review/approval and, when approved, granted to the given associated party.

In one embodiment, the activities and attributes of the given associated party, the permissions granted to similarly situated associated parties within the organization, and/or permissions granted to the similar parties of the similarly situated organizations, and any exceptions/special permissions and/or case-by-case approvals granted to the given associated party, or similarly situated parties, are then monitored and processed so that when a need to modify the permissions granted to the given associated party is identified, modified permissions for the given associated party are generated, proposed, and, in one embodiment, submitted for review/approval. In one embodiment, when approved, the modified permissions for the given associated party are granted to the given associated party.

The disclosed embodiments provide a technical solution to the technical problem of efficiently, effectively, and systematically providing permissions to parties in an organization in a logical and consistent way.

In addition, the disclosed embodiments provide a technical solution that provides for the logical and systematic evolution of the permissions granted to a party in response to the party's activity within the organization and similarly situated parties within the organization. Therefore, permissions are consistently provided to similarly situated associated parties of the organization according to the desires, preferences, and risk tolerance of the organization.

The disclosed embodiments also provide a technical solution that, in one embodiment, takes into account the practices of organizations similar to the subject organization.

In addition, in one embodiment, a technical solution is provided that allows for the consistent and systematic evolution of the permissions granted to a party in response to the party's activity within the organization, similarly situated parties within the organization, and similarly situated parties in similarly situated organizations, to consistently provide permissions to similarly situated parties in an entire field of endeavor of an organization according to the desires, preferences, and risk tolerance of the organization.

Figure 1:
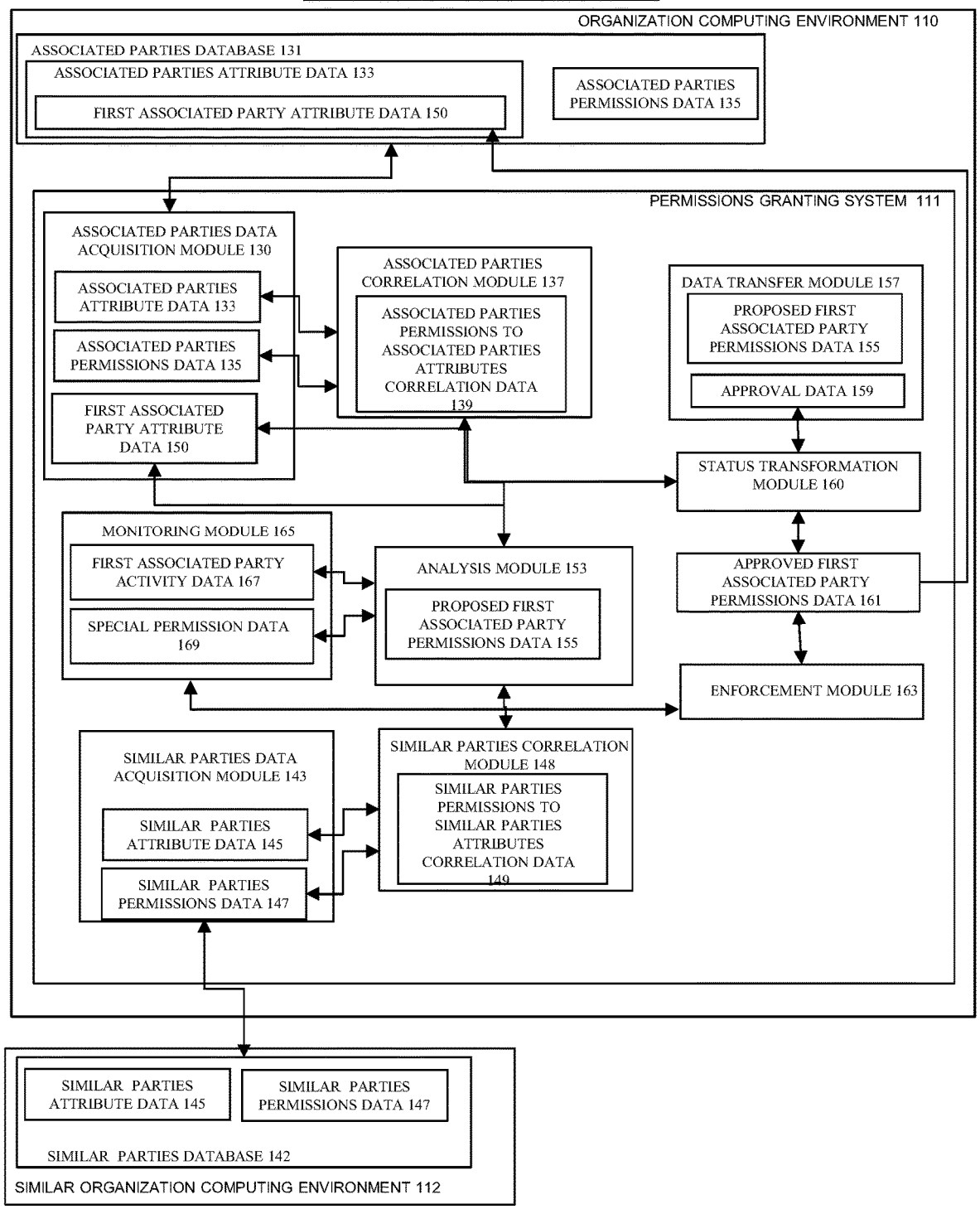
FIG. 1 is a functional block representation of a production environment for implementing a method and system for granting permissions to parties within an organization in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

Herein, a data management system can be, but is not limited to, any system or application implemented on a computing system, accessed through one or more servers, accessed through a network, accessed through a cloud, and/or provided through any system or by any means, as discussed herein, and/or as known in the art at the time of filing, and/or as developed after the time of filing, that gathers data from one or more sources and/or has the capability to analyze and categorize at least part of the data.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to, the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given application as that application is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement an application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. The hardware systems may employ processing logic that includes one or more processors, microprocessors, multi-core processors, and/or Field Programmable Gate Arrays (FPGAs) to execute operations disclosed herein. One or more memory (volatile and/or non-volatile) may be communicatively coupled to the processing logic to store instructions to execute operations and/or store data. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience" includes not only the data entry process, but also other user experience features provided or displayed to the user such as, but not limited to the following: interfaces; images; backgrounds; avatars; highlighting mechanisms; icons; and any other features that individually, or in combination, create a user experience, as discussed herein, and/or as known in the art at the time of filing, and/or as developed after the time of filing.

Herein, the term "organization" includes any entity that has associated "parties" that interface with, interact with, perform tasks for, perform tasks in association with, or in any way represent or act on behalf of the entity.

Herein, the term "party," and "party associated with an organization" are used interchangeably and include any party and/or entity that interfaces with, interacts with, performs tasks for, performs task in association with, or in any way represents or acts on behalf of an organization. For instance, in various embodiments, a "party" can be an employee or contractor of an organization. In addition, a "party" can be, but is not limited to, a person, a commercial entity, an application, a service, and/or a computing system.

Herein the term "permissions" includes rights or capabilities that are granted/used to control and monitor the types of activities in which "parties" associated with an "organization" engage. Some specific examples of permissions that can be granted a given party in an organization include, but are not limited to: access to data and the types of data to which the party is provided access; the capability to perform various actions or tasks within the organization and/or access to the data and applications used by the organization; the level of review required for any tasks and actions taken by the party; the capability to act as an agent for the organization, and incur debt, pay bills, sign agreements or otherwise represent the organization; spending and transaction limits imposed on the party; types of work the party can perform; types of clients the party can service or interact with; specific clients to which the party is provided access; the level of independence of operation afforded to the party; and/or any other of the numerous forms of permissions assigned to a given party within an organization so that the activities of the party can be controlled and monitored.

As used herein the terms "party attribute," "trust factor," and "competency factor" are used together or interchangeably to include factors used to determine the "permissions" granted to "parties" associated with an "organization." As specific illustrative examples, "party attributes," "trust factors" and "competency factors" can include, but are not limited to, one of more of: the job description associated with the party; how long the party has been associated with the organization; the performance level of the party; the party's employment history and special permission grants; and various other trust or competency factors whether specifically identified or not.

Herein the term special permissions include the approval of rights or capabilities that are different from, or exceed, the rights, limits, or capabilities currently granted/used to control and monitor the types of activities in which a given "party" associated with an "organization" engages. Some specific examples of special permissions that can be granted a given party in an organization include, but are not limited to: one time or case-by-case approvals, and/or allowance, and/or waiver of limits and/or access to data and types of data; one time or case-by-case approvals, and/or allowance, and/or waiver of limits on a capability to perform various actions or tasks within the organization and/or access to the data and applications used by the organization; one time or case-by-case approvals, and/or allowance, and/or waiver of review required for any tasks and actions taken by the party; one time or case-by-case approvals, and/or allowance, and/or waiver of limits on the capability to act as an agent for the organization, and incur debt, pay bills, sign agreements or otherwise represent the organization; one time or case-by-case approvals, and/or allowance, and/or waiver of spending and transaction limits imposed on the party; one time or case-by-case approvals, and/or allowance, and/or waiver of restriction on the types of work the party can perform; one time or case-by-case approvals, and/or allowance, and/or waiver of restrictions on the types of clients the party can service or interact with; one time or case-by-case approvals, and/or allowance, and/or waiver of restrictions on specific clients to which the party is provided access; one time or case-by-case approvals, and/or allowance, and/or waiver of restrictions on the level of independence of operation afforded to the party; and/or any other one time or case-by-case approval, and/or allowance, and/or waiver of any of the numerous forms of permissions assigned to a given party within an organization so that the activities of the party can be controlled and monitored, as discussed herein, and/or as known in the art at the time of filing, and/or as developed after the time of filing.

Overview

Embodiments of the present disclosure provide a method and system for systematically and consistently determining permissions that should be granted to a party within organization and then monitoring and adjusting those permissions as needed to allow the party to perform their tasks in the organization as the party's activities within the organization evolve.

The disclosed embodiments provide a technical solution to the technical problem of efficiently and effectively providing permissions to parties in an organization in a logical and consistent way to provide for the correlation of the attributes of a party to the permissions granted a party in accordance with the desires, preferences, and risk tolerance of the organization.

In addition, some disclosed embodiments provide a technical solution that uses artificial intelligence to provide for the evolution of the permissions granted to a party in response to the party's activity within the organization and similarly situated parties within the organization to consistently provide permissions to similarly situated associated parties of the organization according to the desires, preferences, and risk tolerance of the organization.

The disclosed embodiments also provide a technical solution that, in one embodiment, takes into account the practices of organizations similar to the subject organization and allows the correlation of the attributes of a party to the permissions granted a party according to the desires, preferences, risk tolerance of the organization, and the level of similarity between the similar organizations and the organization, and/or the level of similarity between the similar parties and the associated parties of the organization.

In addition, in one embodiment, a technical solution is provided that uses artificial intelligence to provide for the systematic and consistent evolution of the permissions granted to a party in response to the party's activity within the organization, similarly situated parties within the organization, and similarly situated parties in similarly situated organizations to provide permissions to similarly situated parties in an entire field of endeavor of an organization according to the desires, preferences, and risk tolerance of the organization.

Consequently, the present disclosure provides highly efficient, effective, and versatile methods and systems for determining what permissions should be granted to a party within organization. However, the disclosed embodiments do not encompass, embody, or preclude other forms of innovation in the area of permissions monitoring and management, or employee management.

In addition, the disclosed embodiments do not represent an abstract idea for at least a few reasons. First, using artificial intelligence and big data techniques to efficiently and effectively determine permissions that should be granted to a party within organization and then monitoring and adjusting those permissions as needed to allow the party to perform their tasks in the organization as the party's activities within the organization evolve is not an abstract idea because it is not merely an idea itself (e.g., cannot be performed mentally or using pen and paper). As one example, the disclosed embodiments require the use of special data sources and data processing algorithms. Indeed, some of the disclosed embodiments include creating, and in some embodiments labeling, special training data sets, developing, applying, and dynamically modifying one or more analytics models using supervised, and/or unsupervised, and/or semi-supervised training processes, and the application of artificial intelligence and structured and/or unstructured user feedback; none of which can be performed mentally or with pen and paper alone.

Second, using artificial intelligence and big data techniques to efficiently and effectively determine permissions that should be granted to a party within organization and then monitoring and adjusting those permissions as needed to allow the party to perform their tasks in the organization as the party's activities within the organization evolve is not an abstract idea because it is not a fundamental economic practice (e.g., is not merely creating a contractual relationship, hedging, mitigating a settlement risk, etc.).

Third, using artificial intelligence and big data techniques to efficiently and effectively determine permissions that should be granted to a party within organization and then monitoring and adjusting those permissions as needed to allow the party to perform their tasks in the organization as the party's activities within the organization evolve is not an abstract idea because it is not a method of organizing human activity (e.g., managing a game of bingo).

Fourth, although, in one embodiment, mathematics, and/or unsupervised machine learning, and/or supervised machine learning, and/or semi-supervised machine learning, may be used to generate an analytics model, using artificial intelligence and big data techniques to efficiently and effectively determine permissions that should be granted to a party within organization and then monitoring and adjusting those permissions as needed to allow the party to perform their tasks in the organization as the party's activities within the organization evolve, is not simply a mathematical relationship/formula.

Further, using artificial intelligence and big data techniques to efficiently and effectively determine permissions that should be granted to a party within organization and then monitoring and adjusting those permissions as needed to allow the party to perform their tasks in the organization as the party's activities within the organization evolve adds significantly to the field of data management, employee management, resource management, and resource security.

In addition, by centralizing and objectively organizing the allocation of permissions using artificial intelligence and big data techniques, the size of databases, the amount of memory required for the processing and storage of data, the bandwidth required to transfer data, and amount of data processing cycles utilized can be reduced within an organization. As a result, embodiments of the present disclosure allow for reduced use of processor cycles, processor power, communications bandwidth, memory usage, and power consumption. Consequently, computing and communication systems implementing or providing the embodiments of the present disclosure are transformed into more operationally efficient devices and systems.

In addition, in one embodiment, artificial intelligence and big data techniques are used to efficiently and effectively determine data access and secrets distribution permissions that should be granted to a party within organization and then monitor and adjust those permissions as needed to allow the party to perform their tasks in the organization as the party's activities within the organization evolve. This, in turn, provides for more secure computing systems and data and helps solve many Internet-based issues regarding the security of data and personal information. As a result, computing systems and networks are transformed into more secure and effective systems by implementing the method and system for granting permissions to parties within an organization.

Exemplary Operational Environment

FIG. 1 is a functional block representation of a production environment 100 for implementing a system for granting permissions to parties within an organization in accordance with one embodiment. As seen in FIG. 1, production environment 100 includes organization computing environment 110 and similar organization computing environment 112.

As also seen in FIG. 1, organization computing environment 110 includes associated parties database 131, including associated parties attribute data 133, associated parties permissions data 135, and first associated party attribute data 150, which, in one embodiment, is a sub-set of associated parties attribute data 133. In one embodiment, associated parties database 131 is an employee database for an organization and associated parties attribute data 133 and associated parties permissions data 135 are part of employee profile data (not shown).

As seen in FIG. 1, organization computing environment 110 also includes, in this specific example, permission granting system 111. However, in other embodiments, permission granting system 111 is separate from organization computing environment 110 and can be, but is not limited to, one or more of the following: a service or system separate from the organization and organization computing environment 110; a service or system implemented on a computing system; a service or system accessed through one or more servers; a service or system accessed through a network; a service or system accessed through a cloud; and/or a service or system provided through any system or by any means, as discussed herein, and/or as known in the art at the time of filing, and/or as developed after the time of filing.

As also seen in FIG. 1, similar organization computing environment 112 includes similar parties database 142, including similar parties attribute data 145 and similar parties permissions data 147. In one embodiment, similar parties database 142 is an employee database for an organization similar to the organization of organization computing environment 110 and similar parties attribute data 145 and similar parties permissions data 147 are part of employee profile data (not shown) for the similar organization. In various embodiments, similar organization computing environment 112 including similar parties database 142, similar parties attribute data 145, and similar parties permissions data 147, is representative of multiple organizations that are similar to the organization of organization computing environment 110.

In accordance with one embodiment, associated parties data acquisition module 130 is used to obtain or generate associated parties attribute data 133 representing attributes of associated parties currently or historically associated with an organization.

In accordance with one embodiment, the associated parties of the organization include one or more of: employees of the organization; contractors to the organization; volunteers to the organization; clients of the organization; members of the organization; and/or any other parties associated with an organization as discussed herein, and/or as known in the art at the time of filing, and/or as become known after the time of filing.

In accordance with one embodiment, party attributes include one or more of: how long the party has been associated with the organization; a title of the party within the organization; a job description for the party within the organization; the experience of the party outside the organization; the education or training level of the party; special skill sets associated with the party; evaluation and performance data associated with the party; the salary of the party; trust scores or ratings associated with the party; test scores or rankings associated with the party; evaluation data from a supervisor of the party; any data in an employee record associated with the party deemed relevant; and/or any other party attributes as discussed herein, and/or as known in the art at the time of filing, and/or as become known after the time of filing.

In accordance with one embodiment, associated parties data acquisition module 130 is used to obtain or generate associated parties permissions data 135 representing permissions granted to the associated parties currently or historically associated with the organization.

In accordance with one embodiment, the party permissions include one or more of: amounts of data to which the party is provided access; types of data to which the party is provided access; the capability of the party to perform various actions or tasks within the organization; the party's access to the data management and other applications used by the organization; the level of review required for various tasks and actions taken by the party; the capability and limits placed on the party to act as an agent for the organization; the capability and limits placed on the party to incur debt; the capability and limits on the party to pay bills; the capability and limits on the associated party to deal with, i.e., handle, cash; the capability and limits on the party to generate and sign agreements or otherwise represent the organization; spending, transaction, and requisition limits imposed on the party; types of work the party can perform; types of clients the party can service, access, or interact with; specific clients to which the party is provided access; the level of independence of operation afforded to the party; and/or any party permissions as discussed herein, and/or as known in the art at the time of filing, and/or as become known after the time of filing.

In accordance with one embodiment, associated parties correlation module 137 is used to correlate one or more permissions represented by the associated parties permissions data 135 to one or more attributes represented in the associated parties attribute data 133.

In accordance with one embodiment, associated parties correlation module 137 includes one or more processors used to generate associated parties permissions to associated parties attributes correlation data 139 representing the correlation of the one or more associated parties permissions of parties permissions data 135 to the one or more associated parties attributes of associated parties attribute data 133.

In accordance with one embodiment, associated parties correlation module 137 includes one or more processors implementing one or more algorithms used to weight, rank, or otherwise process the associated parties permissions to associated parties attributes correlation data 139 in accordance with the defined or determined desires, preferences, and risk tolerance of the organization.

In various embodiments, the specific algorithms used to weight, rank, or otherwise process the associated parties permissions to associated parties attributes correlation data 139 is dependent on the type of organization and/or associated parties. Those of skill in the art will readily recognize that specific algorithms will vary greatly between, for example, an organization of certified public accountants and an organization that is a fast food restaurant.

In addition, specific algorithms may vary greatly between, for example, different departments within an organization, such as, illustratively, an accounting and a marketing department within the same organization.

So as an even more specific illustrative example, when the organization is a data processing center handing sensitive consumer information, and the associated parties under consideration are data processors accessing data of various levels of sensitivity, a portion of the associated parties permissions to associated parties attributes correlation data 139 representing a correlation of the data processor associated parties job titles within the organization attribute to the level of sensitivity of data the data processor associated parties are allowed to access permission might be given a relatively high weighting based the idea that a data processor's job title/role within the company should be highly correlated to the sensitivity of the data she can access.

As another specific illustrative example, when the organization is a fast food restaurant, and the associated parties under consideration are cashiers handing money for the organization, a portion of the associated parties permissions to associated parties attributes correlation data 139 representing a correlation of the cashier associated parties length of service as cashiers attribute to the amount of cash the cashier associated parties are allowed to have in their register permission might be given a relatively high weighting based the idea that a longer term employee can be afforded more trust.

As another specific illustrative example, when the organization is a law firm, and the associated parties under consideration are paralegals having specialties such as patent or litigation, a portion of the associated parties permissions to associated parties attributes correlation data 139 representing a correlation of the paralegal associated parties' specialties as paralegals attribute to the types of documents the paralegal associated parties are allowed to produce and send out to clients permission might be given a relatively high weighting based the idea that the documents a paralegal is allowed to prepare and send to clients and the specialty of the paralegal should be highly correlated.

Those of skill in the art will readily recognize that the examples above are illustrative only and that numerous other weightings, rankings, and preferences for specific associated parties permissions to associated parties attributes correlations are possible depending on the type of organizations and the defined, or determined, preferences of the organizations. Consequently, the illustrative examples above do not limit or define the scope of the claims.

In accordance with one embodiment, similar parties data acquisition module 143 is used to obtain or generate similar parties attribute data 145 representing attributes of similar parties currently or historically associated with one or more similar organizations that are distinct from the organization but that are determined to be similarly situated with respect to the organization.

In accordance with one embodiment, similar parties are identified by the organization. In accordance with one embodiment, similar parties are identified by a third party, service, or organization.

In accordance with one embodiment, the similar parties are identified based on one or more party similarity factors, including, but not limited to: the similarity of job descriptions of the associated parties and similar parties; the similarity of titles of the associated parties and similar parties; the similarity of locations of the associated parties and similar parties; the similarity of salaries of the associated parties and similar parties; the similarity of duration of employment of the associated parties and similar parties; the similarity of the experience of the associated parties and similar parties; the similarity of the education or training level of the associated parties and similar parties; the similarity of the ages of the associated parties and similar parties; the similarity of special skill sets of the associated parties and similar parties; the similarity of any data associated with the associated parties and similar parties deemed to be relevant; and/or any other similarities or factors as discussed herein, and/or as known in the art at the time of filing, and/or as become known after the time of filing.

In accordance with one embodiment, similar parties data acquisition module 143 includes one or more processors implementing one or more algorithms used to weight, rank, or otherwise process similar parties attribute data 145 and, in particular, more heavily weight, or otherwise give preference, to party similarity factors.

In various embodiments, the specific algorithms used to weight, rank, or otherwise process the similar parties attribute data 145 is dependent on the type of organization and/or associated and similar parties. Those of skill in the art will readily recognize that specific algorithms will vary greatly between, for example, organizations of certified public accountants and organizations in the food industry.

For example, when the organization is an accounting firm the similarity of the specialties, education, or experience of the similar parties and the associated parties might be given a relatively high weighting while the similarity of the geographic location or age of similar parties and the associated parties might be given a relatively lower weighting when determining which parties are similar parties.

In accordance with one embodiment, similar organizations are identified by the organization. In accordance with one embodiment, similar organizations are identified by a third party, service, or organization.

In accordance with one embodiment, similar organizations are identified based on one or more organization similarity factors such as, but not limited to: the similarity of function of the organization and similar organizations; the similarity of service or goods provided by the organization and similar organizations; the similarity of markets serviced by the organization and similar organizations; the similarity of clients of the organization and similar organizations; the similarity of revenue of the organization and similar organizations; the similarity of the number of associated parties of the organization and similar organizations; the similarity of location of the organization and similar organizations; the similarity of the number of locations of the organization and similar organizations; the similarity of tax structure of the organization and similar organizations; the similarity of management structure of the organization and similar organizations; and/or any other similarities or factors as discussed herein, and/or as known in the art at the time of filing, and/or as become known after the time of filing.

In accordance with one embodiment, one or more processors implementing one or more algorithms are used to weight, rank, or otherwise process, data representing the organization similarity factors and, in particular, more heavily weight, or otherwise give preference, to specific organization similarity factors.

In various embodiments, the specific algorithms used to weight, rank, or otherwise process the organization similarity factors is dependent on the type of organization and/or parties under consideration. Those of skill in the art will readily recognize that specific algorithms will vary greatly between, for example, organizations of certified public accountants and organizations in the food industry.

For example, when the organization and similar organization are fast food restaurants, location, type of food offered, and hours of operation organization similarity factors might be given a relatively high weighting while the number of employees, or age of employees, might be given a relatively low weighting when determining or identifying similar organizations.

In accordance with one embodiment, similar parties data acquisition module 143 is used to obtain or generate similar parties permissions data 147 representing permissions granted to the similar parties currently or historically associated with the one or more similar organizations.

In accordance with one embodiment, similar parties correlation module 148 is used to correlate one or more permissions represented by the similar parties permissions data 147 to one or more attributes represented in the similar parties attribute data 145. In accordance with one embodiment, similar parties correlation module 148 is used to generate similar parties permissions to similar parties attributes correlation data 149 representing the correlation of the one or more similar parties permissions to the one or more similar parties attributes.

In accordance with one embodiment, similar parties correlation module 148 includes one or more processors used to implement one or more algorithms used to weight, rank, or otherwise process, the similar parties permissions to similar parties attributes correlation data 149. In accordance with one embodiment, similar parties correlation module 148 includes one or more processors used to implement one or more algorithms used to weight, rank, or otherwise process, the similar parties permissions to similar parties attributes correlation data 149 based on the similarity between the organization and the similar organization. In accordance with one embodiment, similar parties correlation module 148 includes one or more processors used to implement one or more algorithms used to weight, rank, or otherwise process, the similar parties permissions to similar parties attributes correlation data 149 based on the similarity between the associated parties and the similar parties, as discussed herein, and/or as known in the art at the time of filing, and/or as developed after the time of filing.

In accordance with one embodiment, similar parties correlation module 148 includes one or more processors used to implement one or more algorithms used to weight, rank, or otherwise process, the similar parties permissions to similar parties attributes correlation data 149 based, at least in part, on one or more of: the level of similarity of function of the organization and similar organizations; the level of similarity of service or goods provided by the organization and similar organizations; the level of similarity of markets serviced by the organization and similar organizations; the level of similarity of clients of the organization and similar organizations; the level of similarity of revenue of the organization and similar organizations; the level of similarity of the number of associated parties of the organization and similar organizations; the level of similarity of location of the organization and similar organizations; the similarity of the number of locations of the organization and similar organizations; the level of similarity of tax structure of the organization and similar organizations; the level of similarity of management structure of the organization and similar organizations; the level of similarity of job descriptions of the associated parties and similar parties; the level of similarity of titles of the associated parties and similar parties; the level of similarity of locations of the associated parties and similar parties; the level of similarity of salaries of the associated parties and similar parties; the level of similarity of duration of employment of the associated parties and similar parties; the level of similarity of the experience of the associated parties and similar parties; the level of similarity of the education or training level of the associated parties and similar parties; the level of similarity of the ages of the associated parties and similar parties; the level of similarity of special skill sets of the associated parties and similar parties; the level of similarity of any data associated with the associated parties and similar parties deemed to be relevant; and level of any other similarities or factors as discussed herein, and/or as known in the art at the time of filing, and/or as become known after the time of filing in accordance with the desires, preferences, and risk tolerance of the organization.

In accordance with one embodiment, similar parties correlation module 148 includes one or more processors implementing one or more algorithms used to weight, rank, or otherwise process similar parties permissions to similar parties attributes correlation data 149 in accordance with the defined or determined desires, preferences, and risk tolerance of the organization.

In various embodiments, the specific algorithms used to weight, rank, or otherwise process similar parties permissions to similar parties attributes correlation data 149 is dependent on the type of organization and/or associated parties. Those of skill in the art will readily recognize that specific algorithms will vary greatly between, for example, an organization of certified public accountants and an organization that is a fast food restaurant.

In addition, specific algorithms may vary greatly between, for example, different departments within an organization, such as, illustratively, an accounting and a marketing department within the same organization.

So as an even more specific illustrative example, when the organization and similar organizations are data processing centers handing sensitive consumer information, and the similar parties under consideration are data processors accessing data of various levels of sensitivity, a portion of similar parties permissions to similar parties attributes correlation data 149 representing a correlation of the data processor similar parties job title within the similar organization attribute to the level of sensitivity of data the data processor similar parties are allowed to access permission might be given a relatively high weighting based the idea that a data processor's job title/role within the company should be highly correlated to the sensitivity of the data she can access.

As another specific illustrative example, when the organization is a fast food restaurant, and the similar parties under consideration are cashiers handing money for the similar organization, a portion of similar parties permissions to similar parties attributes correlation data 149 representing a correlation of the cashier similar parties length of service as a cashier attribute to the amount of cash the cashier similar parties are allowed to have in their register permission might be given a relatively high weighting based the idea that a longer term employee can be afforded more trust.

As another specific illustrative example, when the organization is a law firm, and the similar parties under consideration are paralegals having specialties such as patent or litigation, a portion of similar parties permissions to similar parties attributes correlation data 149 representing a correlation of the paralegal similar parties' specialty as a paralegal attribute to the types of documents the paralegal similar parties are allowed to produce and send out to clients permission might be given a relatively high weighting based the idea that the documents a paralegal is allowed to prepare and send to clients and the specialty of the paralegal should be highly correlated.

Those of skill in the art will readily recognize that the examples above are illustrative only and that numerous other weightings, rankings, and preferences for specific similar parties permissions to similar parties attributes correlations are possible depending on the type of organizations and the defined, or determined, preferences of the organizations. Consequently, the illustrative examples above do not limit or define the scope of the claims.

In accordance with one embodiment, the organization, and/or similar organizations, are businesses and the associated parties, and/or similar parties, are employees of the businesses.

In accordance with one embodiment, associated parties data acquisition module 130 is used to obtain or generate first associated party attribute data 150 representing attributes of a first associated party associated with the organization.

In accordance with one embodiment, the organization, and/or similar organizations, are businesses and the associated parties, and/or similar parties, are employees of the businesses, and the first associated party is a new employee or contractor of the business.

In accordance with one embodiment, analysis module 153 is used to analyze and process the first associated party attribute data 150 and one or more of the associated parties permissions to associated parties attributes correlation data 139 and/or the similar parties permissions to similar parties attributes correlation data 149 to generate proposed first associated party permissions data 155 representing proposed first associated party permissions proposed to be granted to the first associated party of the first associated party attribute data 150.

In accordance with one embodiment, data transfer module 157 is used to provide the proposed first associated party permissions data 155 to one or more designated decision makers within the organization for approval (not shown).

In accordance with various embodiments, the designated decision makers are owners of the resources controlled through the permissions granted. In accordance with various embodiments, the designated decision makers are other applications or computing systems. In accordance with various embodiments, the designated decision makers are supervisors of the first party. In accordance with various embodiments, the designated decision makers are any parties, systems, or other entities, as discussed herein, and/or as known in the art at the time of filing, and/or as become known after the time of filing.

In accordance with one embodiment, data transfer module 157 is used to receive approval data 159 representing approval of the proposed first associated party permissions data 155 from the one or more designated decision makers within the organization.

In accordance with one embodiment, approval of the proposed first associated party permissions data 155 is automatic, or semi-automatic, and therefore requires no, or minimal, designated decision maker approval.

In accordance with one embodiment, upon receipt of approval data 159, status transformation module 160 is used to transform data (not shown) representing the status of the proposed first associated party permissions data 155 from "proposed" first associated party permissions data 155 to "approved" first associated party permissions data 161.

In accordance with one embodiment, status transformation module 160 is used to integrate the approved first associated party permissions data 161 into the first associated party attribute data 150 to update the first associated party attribute data 150.

In accordance with one embodiment, enforcement module 163 is used to enforce the first associated party permissions represented by the approved first associated party permissions data 161.

In accordance with one embodiment, the first associated party permissions represented by the approved first associated party permissions data 161 are enforced by using enforcement module 163 and monitoring module 165 to monitor the activities of the first associated party and blocking or allowing access and activities of the first associated party based on the approved first associated party permissions represented by the approved first associated party permissions data 161. In one embodiment, first associated party activity data 167, representing the allowed, blocked, and specially permitted access and activities of the first associated party, is obtained and stored.

In accordance with one embodiment, monitoring module 165 is used to monitor the first associated party's attribute data 150, the first associated party's activities data 167, and special permission data 169 representing any special permissions granted to the first associated party within the organization.

In accordance with one embodiment, the special permissions granted to the first associated party within the organization of special permission data 169 include instances where the first associated party is granted permissions not included in, or within the limits of, the approved first associated party permissions represented by the approved first associated party permissions data 161.

As noted above, special permissions include the case-by-case, or non-routine, approval of rights or capabilities that are beyond or exceed the rights, limits, or capabilities currently granted/used to control and monitor the types of activities in which a given "party" associated with an "organization" engages as defined by approved first associated party permissions data 161.

Some specific examples of special permissions that can be granted a given party in an organization include, but are not limited to: one time or case-by-case approvals, and/or allowance, and/or waiver of limits and/or access to data and types of data; one time or case-by-case approvals, and/or allowance, and/or waiver of limits on a capability to perform various actions or tasks within the organization and/or access to the data and applications used by the organization; one time or case-by-case approvals, and/or allowance, and/or waiver of review required for any tasks and actions taken by the party; one time or case-by-case approvals, and/or allowance, and/or waiver of limits on the capability to act as an agent for the organization, and incur debt, pay bills, sign agreements or otherwise represent the organization; one time or case-by-case approvals, and/or allowance, and/or waiver of spending and transaction limits imposed on the party; one time or case-by-case approvals, and/or allowance, and/or waiver of restriction on the types of work the party can perform; one time or case-by-case approvals, and/or allowance, and/or waiver of restrictions on the types of clients the party can service or interact with; one time or case-by-case approvals, and/or allowance, and/or waiver of restrictions on specific clients to which the party is provided access; one time or case-by-case approvals, and/or allowance, and/or waiver of restrictions on the level of independence of operation afforded to the party; and/or any other one time or case-by-case approval, and/or allowance, and/or waiver of the numerous forms of permissions assigned to a given party within an organization so that the activities of the party can be controlled and monitored.

As a specific illustrative example of a special permission, a party in an organization may be limited to spending no more than $1000.00 in credit card transactions using a business credit card by approved first associated party permissions data 161. However, it may occur that on a case-by-case basis the party has been given approval, i.e., a special permission, to spend over $1000.00 and, in one embodiment, this special permission was approved and/or provided by a supervisor. In one embodiment, data representing this special permission is identified by monitoring module 165 and obtained as part of first associated party activity data 167 and stored as part of special permission data 169.

As another specific illustrative example of a special permission, a party in an organization may be limited to accessing only specific organizational data by approved first associated party permissions data 161. However, it may occur that on a case-by-case basis the party has been given approval, i.e., a special permission, to access other organizational data and, in one embodiment, this special permission was approved and/or provided by a supervisor. In one embodiment, data representing this special permission is identified by monitoring module 165 and obtained as part of first associated party activity data 167 and stored as part of special permission data 169.

As another specific illustrative example of a special permission, a party in an organization may be limited to making changes to only specific organizational programs or data by approved first associated party permissions data 161. However, it may occur that on a case-by-case basis the party has been given approval, i.e., a special permission, to change other data and/or programs and, in one embodiment, this special permission was approved and/or provided by a supervisor. In one embodiment, data representing this special permission is identified by monitoring module 165 and obtained as part of first associated party activity data 167 and stored as part of special permission data 169.

As another specific illustrative example of a special permission, a party in an organization may be required to have their work, or work on certain project activities, reviewed by a supervisor by approved first associated party permissions data 161. However, it may occur that on a case-by-case basis the party has been given approval, i.e., a special permission, to waive the review requirement and, in one embodiment, this special permission was approved and/or provided by a supervisor. In one embodiment, data representing this special permission is identified by monitoring module 165 and obtained as part of first associated party activity data 167 and stored as part of special permission data 169.

As another specific illustrative example of a special permission, a party in an organization may be prohibited from signing on behalf of, or otherwise acting as an agent for, the organization, by approved first associated party permissions data 161. However, it may occur that on a case-by-case basis the party has been given approval, i.e., a special permission, to sign for, or act as an agent for, the organization and, in one embodiment, this special permission was approved and/or provided by a supervisor. In one embodiment, data representing this special permission is identified by monitoring module 165 and obtained as part of first associated party activity data 167 and stored as part of special permission data 169.

In various embodiments, any other forms of special permissions, as discussed herein, and/or as known in the art at the time of filing, and/or as become known after the time of filing are identified by monitoring module 165 and obtained as part of first associated party activity data 167 and stored as part of special permission data 169.

In accordance with one embodiment, monitoring module 165 includes one or more processors used to identify a need to modify the first associated party permissions represented by the approved first associated party permissions data 161 based, at least in part, on the monitoring of the first associated party's attribute data 150, the first associated party activity data 167, and special permission data 169 representing any special permissions granted to the first associated party within the organization.

As a specific illustrative example, if a party in an organization is limited to spending no more than $1000.00 in credit card transactions using a business credit card by approved first associated party permissions data 161 but it is determined that on a threshold number of occasions the party has been given approval, i.e., a special permission, to spend over $1000.00, then a determination is made that a need to modify the first associated party permissions represented by the approved first associated party permissions data 161 exists.

As another specific illustrative example, if a party in an organization is limited to accessing only specific organizational data by approved first associated party permissions data 161 but the party has been given approval, i.e., a special permission, to access other organizational data a threshold number of times, then a determination is made that a need to modify the first associated party permissions represented by the approved first associated party permissions data 161 exists.

As another specific illustrative example, if a party in an organization is limited to making changes to only specific organizational programs or data by approved first associated party permissions data 161 but the party has been given approval, i.e., a special permission, to change other data and/or programs a threshold number of times, then a determination is made that a need to modify the first associated party permissions represented by the approved first associated party permissions data 161 exists.

As another specific illustrative example, if a party in an organization is required to have their work, or work on certain project activities, reviewed by a supervisor by approved first associated party permissions data 161 but the party has been given approval, i.e., a special permission, to waive the review requirement a threshold number of times, then a determination is made that a need to modify the first associated party permissions represented by the approved first associated party permissions data 161 exists.

As another specific illustrative example, if a party in an organization is prohibited from signing on behalf of, or otherwise acting as an agent for, the organization, by approved first associated party permissions data 161 but the party has been given approval, i.e., a special permission, to sign for, or act as an agent for, the organization a threshold number of times, then a determination is made that a need to modify the first associated party permissions represented by the approved first associated party permissions data 161 exists.

In one embodiment, in response to each identified need to modify the first associated party permissions, analysis module 153 is used to again analyze and process the first associated party attribute data 150 and one or more of the associated parties permissions to associated parties attributes correlation data 139 and the similar parties permissions to similar parties attributes correlation data 149 to generate modified proposed first associated party permissions data 155 representing proposed modified first associated party permissions proposed to be granted to the first associated party.

In one embodiment, in response to each identified need to modify the first associated party permissions, data transfer module 157 is again used to provide the proposed modified first associated party permissions data 155 to one or more designated decision makers within the organization for approval.

In one embodiment, in response to each identified need to modify the first associated party permissions, data transfer module 157 is again used to receive approval data 159 representing approval of the proposed modified first associated party permissions data 155 from the one or more designated decision makers within the organization.

In one embodiment, in response to each identified need to modify the first associated party permissions, status transformation module 160 is again used to transform data representing the status of the proposed modified first associated party permissions data 155 from "proposed modified" first associated party permissions data 155 to "approved" first associated party permissions data 161.

In one embodiment, status transformation module 160 is then used again to integrate the newly approved first associated party permissions data 161 into the first associated party attribute data 150 to update the first associated party attribute data 150.

In one embodiment, enforcement module 163 is then again used to enforce the first associated party permissions represented by the approved first associated party permissions data 161.

In one embodiment, enforcement module 163 and monitoring module 165 are then used to continue to monitor the first associated party's attribute data 150, the first associated party activity data 167, and any special permissions granted to the first associated party within the organization represented by special permission data 169 in order to identify any further need to modify the first associated party permissions.

As seen above, the disclosed illustrative embodiment of FIG. 1 provides a technical solution to the technical problem of efficiently and effectively providing permissions to parties in an organization in a logical and consistent way and uses one or more algorithms to provide for the correlation of the attributes of a party to the permissions granted a party to be accorded preference or special weighting according to the desires, preferences, and risk tolerance of the organization.

Exemplary Processes

Figure 2:
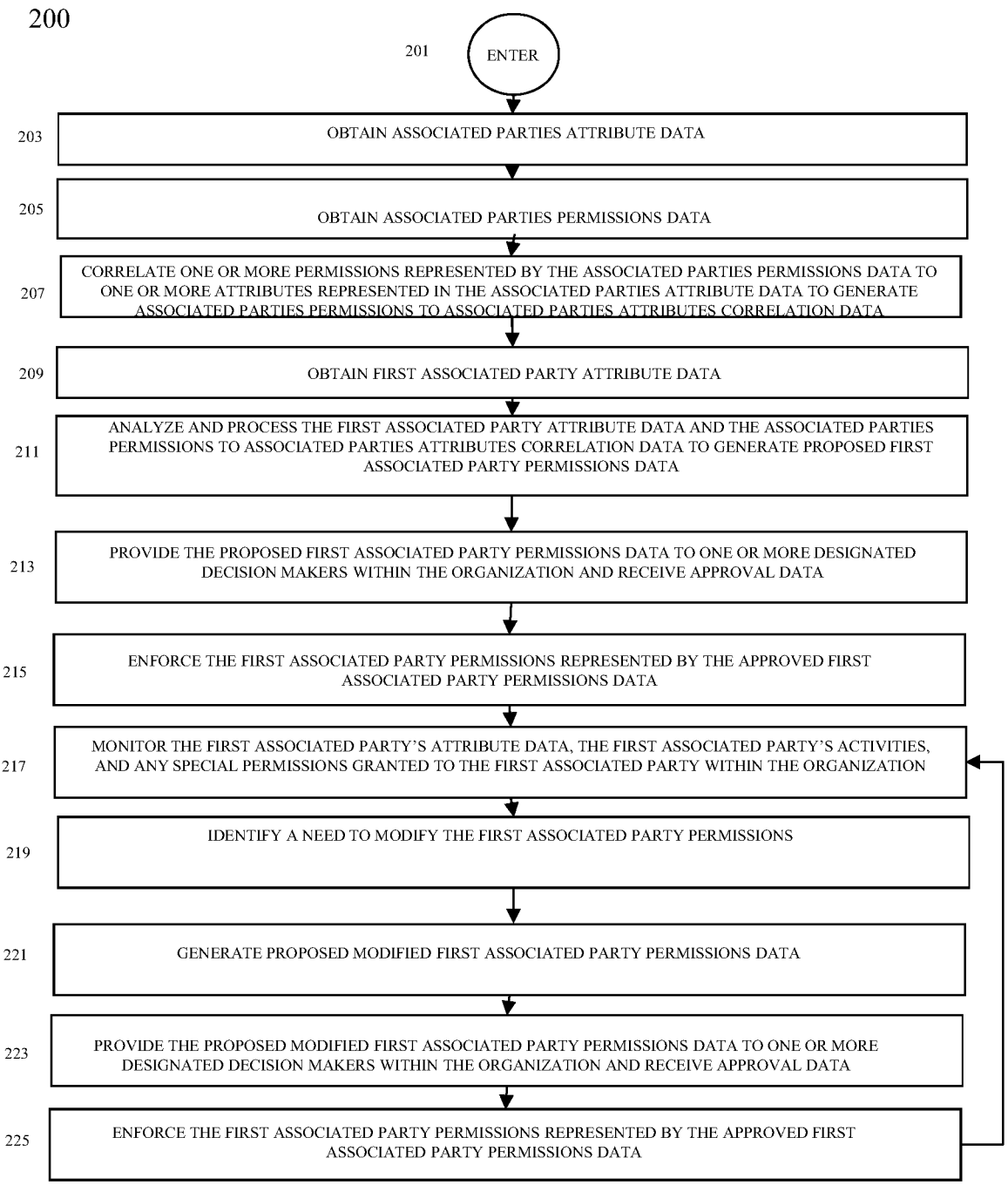
FIG. 2 is an illustrative flow chart for implementing a method and system for granting permissions to parties within an organization in accordance with one embodiment.

FIG. 2 is an illustrative flow chart of a computing system implemented process 200 for granting permissions to parties within an organization in accordance with one embodiment.

Referring to FIGS. 1 and 2, together, process 200 begins at ENTER OPERATION 201 and process flow proceeds to OBTAIN ASSOCIATED PARTIES ATTRIBUTE DATA OPERATION 203.

In accordance with one embodiment, at OBTAIN ASSOCIATED PARTIES ATTRIBUTE DATA OPERATION 203 one or more processors are used to obtain or generate associated parties attribute data representing attributes of associated parties currently or historically associated with an organization.

As discussed above with respect to FIG. 1, in accordance with one embodiment, at OBTAIN ASSOCIATED PARTIES ATTRIBUTE DATA OPERATION 203 associated parties data acquisition module 130 is used to obtain or generate associated parties attribute data 133 representing attributes of associated parties currently or historically associated with an organization.

In accordance with one embodiment, the associated parties of the organization of OBTAIN ASSOCIATED PARTIES ATTRIBUTE DATA OPERATION 203 include one or more of: employees of the organization; contractors to the organization; volunteers to the organization; clients of the organization; members of the organization; and/or any other parties associated with an organization as discussed herein, and/or as known in the art at the time of filing, and/or as become known after the time of filing.

In accordance with one embodiment, the associated parties attributes of OBTAIN ASSOCIATED PARTIES ATTRIBUTE DATA OPERATION 203 include one or more of: how long the party has been associated with the organization; a title of the party within the organization; a job description for the party within the organization; the experience of the party outside the organization; the education or training level of the party; special skill sets associated with the party; evaluation and performance data associated with the party; the salary of the party; trust scores or ratings associated with the party; test scores or rankings associated with the party; evaluation data from a supervisor of the party; any data in an employee record associated with the party deemed relevant; and/or any other party attributes as discussed herein, and/or as known in the art at the time of filing, and/or as become known after the time of filing.

In accordance with one embodiment, once one or more processors are used to obtain or generate associated parties attribute data representing attributes of associated parties currently or historically associated with an organization at OBTAIN ASSOCIATED PARTIES ATTRIBUTE DATA OPERATION 203, process flow proceeds to OBTAIN ASSOCIATED PARTIES PERMISSIONS DATA OPERATION 205.

In one embodiment, at OBTAIN ASSOCIATED PARTIES PERMISSIONS DATA OPERATION 205 one or more processors are used to obtain or generate associated parties permissions data representing permissions granted to the associated parties currently or historically associated with the organization of OBTAIN ASSOCIATED PARTIES ATTRIBUTE DATA OPERATION 203.

As discussed above with respect to FIG. 1, in accordance with one embodiment, at OBTAIN ASSOCIATED PARTIES PERMISSIONS DATA OPERATION 205 associated parties data acquisition module 130 is used to obtain or generate associated parties permissions data 135 representing permissions granted to the associated parties currently or historically associated with the organization.

In accordance with one embodiment, the party permissions of OBTAIN ASSOCIATED PARTIES PERMISSIONS DATA OPERATION 205 include, but are not limited to, one or more of: amounts of data to which the party is provided access; types of data to which the party is provided access; the capability of the party to perform various actions or tasks within the organization; the party's access to the data management and other applications used by the organization; the level of review required for various tasks and actions taken by the party; the capability and limits placed on the party to act as an agent for the organization; the capability and limits placed on the party to incur debt; the capability and limits on the party to pay bills; the capability and limits on the associated party to deal with, i.e., handle, cash; the capability and limits on the party to generate and sign agreements or otherwise represent the organization; spending, transaction, and requisition limits imposed on the party; types of work the party can perform; types of clients the party can service, access, or interact with; specific clients to which the party is provided access; the level of independence of operation afforded to the party; and/or any party permissions as discussed herein, and/or as known in the art at the time of filing, and/or as become known after the time of filing.

In one embodiment, once one or more processors are used to obtain or generate associated parties permissions data representing permissions granted to the associated parties currently or historically associated with the organization at OBTAIN ASSOCIATED PARTIES PERMISSIONS DATA OPERATION 205, process flow proceeds to CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 207.

In accordance with one embodiment, at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 207 one or more processors are used to correlate one or more permissions represented by the associated parties permissions data to one or more attributes represented in the associated parties attribute data.

In accordance with one embodiment, at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 207 one or more processors are used to generate associated parties permissions to associated parties attributes correlation data representing the correlation of the one or more associated parties permissions to the one or more associated parties attributes.

As discussed in more detail above with respect to FIG. 1, in accordance with one embodiment at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 207 one or more processors implementing one or more algorithms are used to weight the associated parties permissions to associated parties attributes correlation data in accordance with the desires, preferences, and risk tolerance of the organization.

In accordance with one embodiment, at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 207 one or more processors are used to store the associated parties permissions to associated parties attributes correlation data in an associated parties permissions to associated parties attributes correlation data section of a memory.

As discussed above with respect to FIG. 1, in accordance with one embodiment, associated parties correlation module 137 is used to correlate one or more permissions represented by the associated parties permissions data 135 to one or more attributes represented in the associated parties attribute data 133 at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 207.

As also discussed with respect to FIG. 1, in accordance with one embodiment, associated parties correlation module 137 includes one or more processors used to generate associated parties permissions to associated parties attributes correlation data 139 representing the correlation of the one or more associated parties permissions of parties permissions data 135 to the one or more associated parties attributes of associated parties attribute data 133.

In accordance with one embodiment, once one or more processors are used to correlate one or more permissions represented by the associated parties permissions data to one or more attributes represented in the associated parties attribute data at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 207, process flow proceeds to OBTAIN FIRST ASSOCIATED PARTY ATTRIBUTE DATA OPERATION 209.

In accordance with one embodiment, at OBTAIN FIRST ASSOCIATED PARTY ATTRIBUTE DATA OPERATION 209 one or more processors are used to obtain or generate first associated party attribute data representing attributes of a first associated party associated with the organization.

As discussed above with respect to FIG. 1, in accordance with one embodiment, at OBTAIN FIRST ASSOCIATED PARTY ATTRIBUTE DATA OPERATION 209, associated parties data acquisition module 130 is used to obtain or generate first associated party attribute data 150 representing attributes of a first associated party associated with the organization.

In accordance with one embodiment, the organization is a business and the associated parties are employees of the businesses. In one embodiment, the first associated party is a new employee or contractor of the business.

In accordance with one embodiment, once one or more processors are used to obtain or generate first associated party attribute data representing attributes of a first associated party associated with the organization at OBTAIN FIRST ASSOCIATED PARTY ATTRIBUTE DATA OPERATION 209, process flow proceeds to ANALYZE AND PROCESS THE FIRST ASSOCIATED PARTY ATTRIBUTE DATA AND THE ASSOCIATED PARTIES PERMISSIONS TO ASSOCIATED PARTIES ATTRIBUTES CORRELATION DATA TO GENERATE PROPOSED FIRST ASSOCIATED PARTY PERMISSIONS DATA OPERATION 211.

In accordance with one embodiment, at ANALYZE AND PROCESS THE FIRST ASSOCIATED PARTY ATTRIBUTE DATA AND THE ASSOCIATED PARTIES PERMISSIONS TO ASSOCIATED PARTIES ATTRIBUTES CORRELATION DATA TO GENERATE PROPOSED FIRST ASSOCIATED PARTY PERMISSIONS DATA OPERATION 211 one or more processors are used to analyze and process the first associated party attribute data and the associated parties permissions to associated parties attributes correlation data to generate proposed first associated party permissions data representing proposed first associated party permissions proposed to be granted to the first associated party.

As discussed above with respect to FIG. 1, in accordance with one embodiment, analysis module 153 is used to analyze and process the first associated party attribute data 150 and one or more of the associated parties permissions to associated parties attributes correlation data 139 and/or the similar parties permissions to similar parties attributes correlation data 149 to generate proposed first associated party permissions data 155 representing proposed first associated party permissions proposed to be granted to the first associated party of the first associated party attribute data 150 at ANALYZE AND PROCESS THE FIRST ASSOCIATED PARTY ATTRIBUTE DATA AND THE ASSOCIATED PARTIES PERMISSIONS TO ASSOCIATED PARTIES ATTRIBUTES CORRELATION DATA TO GENERATE PROPOSED FIRST ASSOCIATED PARTY PERMISSIONS DATA OPERATION 211.

In accordance with one embodiment, once one or more processors are used to analyze and process the first associated party attribute data and the associated parties permissions to associated parties attributes correlation data to generate proposed first associated party permissions data representing proposed first associated party permissions proposed to be granted to the first associated party at ANALYZE AND PROCESS THE FIRST ASSOCIATED PARTY ATTRIBUTE DATA AND THE ASSOCIATED PARTIES PERMISSIONS TO ASSOCIATED PARTIES ATTRIBUTES CORRELATION DATA TO GENERATE PROPOSED FIRST ASSOCIATED PARTY PERMISSIONS DATA OPERATION 211, process flow proceeds to PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 213.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 213 one or more processors are used to provide the proposed first associated party permissions data to one or more designated decision makers within the organization for approval.

As discussed above with respect to FIG. 1, in accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 213 data transfer module 157 is used to provide the proposed first associated party permissions data 155 to one or more designated decision makers within the organization for approval (not shown).

In accordance with various embodiments, the designated decision makers of PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 213 are owners of the resources controlled through the permissions granted. In accordance with various embodiments, the designated decision makers are other applications or computing systems. In accordance with various embodiments, the designated decision makers are supervisors of the first party. In accordance with various embodiments, the designated decision makers are any parties, systems, or other entities, as discussed herein, and/or as known in the art at the time of filing, and/or as become known after the time of filing.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 213 one or more processors are used to receive approval data representing approval of the proposed first associated party permissions data from the one or more designated decision makers within the organization.

As discussed above with respect to FIG. 1, in accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 213, data transfer module 157 is used to receive approval data 159 representing approval of the proposed first associated party permissions data 155 from the one or more designated decision makers within the organization.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 213 one or more processors are used to transform the status of the proposed first associated party permissions data from "proposed" first associated party permissions data to "approved" first associated party permissions data.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 213 one or more processors are used to integrate the approved first associated party permissions data into the first associated party attribute data to update the first associated party attribute data.

As discussed above with respect to FIG. 1, in accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 213, upon receipt of approval data 159, status transformation module 160 is used to transform the status of the proposed first associated party permissions data 155 from "proposed" first associated party permissions data 155 to "approved" first associated party permissions data 161.

In accordance with one embodiment, once one or more processors are used to provide the proposed first associated party permissions data to one or more designated decision makers within the organization for approval at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 213, process flow proceeds to ENFORCE THE FIRST ASSOCIATED PARTY PERMISSIONS REPRESENTED BY THE APPROVED FIRST ASSOCIATED PARTY PERMISSIONS DATA OPERATION 215.

In accordance with one embodiment, at ENFORCE THE FIRST ASSOCIATED PARTY PERMISSIONS REPRESENTED BY THE APPROVED FIRST ASSOCIATED PARTY PERMISSIONS DATA OPERATION 215 one or more processors are used to enforce the first associated party permissions represented by the approved first associated party permissions data.

In accordance with one embodiment, the first associated party permissions represented by the approved first associated party permissions data of ENFORCE THE FIRST ASSOCIATED PARTY PERMISSIONS REPRESENTED BY THE APPROVED FIRST ASSOCIATED PARTY PERMISSIONS DATA OPERATION 215 are enforced by using one or more processors to monitor the activities of the first associated party and blocking or allowing access and activities of the first associated party based on the approved first associated party permissions represented by the approved first associated party permissions data.

As discussed above with respect to FIG. 1, in accordance with one embodiment, at ENFORCE THE FIRST ASSOCIATED PARTY PERMISSIONS REPRESENTED BY THE APPROVED FIRST ASSOCIATED PARTY PERMISSIONS DATA OPERATION 215 enforcement module 163 is used to enforce the first associated party permissions represented by the approved first associated party permissions data 161.

In accordance with one embodiment, once one or more processors are used to enforce the first associated party permissions represented by the approved first associated party permissions data at ENFORCE THE FIRST ASSOCIATED PARTY PERMISSIONS REPRESENTED BY THE APPROVED FIRST ASSOCIATED PARTY PERMISSIONS DATA OPERATION 215, process flow proceeds to MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 217.

In accordance with one embodiment, at MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 217 one or more processors are used to monitor the first associated party's attribute data, the first associated party's activities, and any special permissions granted to the first associated party within the organization. In one embodiment, data representing the blocking or allowing of access and activities of the first associated party based on the approved first associated party permissions represented by the approved first associated party permissions data, and any special permissions or approvals granted to the first associated party is obtained and stored.

As discussed above with respect to FIG. 1, in accordance with one embodiment, at MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 217, the first associated party permissions represented by the approved first associated party permissions data 161 are enforced by using enforcement module 163 and monitoring module 165 to monitor the activities of the first associated party and blocking or allowing access and activities of the first associated party based on the approved first associated party permissions represented by the approved first associated party permissions data 161. In one embodiment, first associated party activity data 167, representing the allowed, blocked, and specially permitted access and activities of the first associated party, is obtained and stored.

In accordance with one embodiment, at MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 217 monitoring module 165 is used to monitor the first associated party's attribute data 150, the first associated party's activities data 167, and special permission data 169 representing any special permissions granted to the first associated party within the organization.

In accordance with one embodiment, the special permissions granted to the first associated party within the organization of MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 217 include, but are not limited to, instances where the first associated party is granted permissions not included in, or within the limits of, the approved first associated party permissions represented by the approved first associated party permissions data.

As noted above, special permissions include the approval of rights or capabilities that are beyond or exceed the rights, limits, or capabilities currently granted/used to control and monitor the types of activities in which a given "party" associated with an "organization" engages as defined by approved first associated party permissions data.

As one specific illustrative example, of a special permission, a first associated party in an organization that is an accounting firm may be limited to accessing only data associated with a specific client by the first associated party's approved first associated party permissions data. However, it may occur that on a case-by-case basis the first associated party has been given approval, i.e., a special permission, to access other client's data and, in one embodiment, this special permission was approved and/or provided by a supervisor. In one embodiment, data representing this special permission is identified and obtained as part of the first associated party activity data associated with the first associated party and stored as part of the first associated party's special permission data.

In accordance with one embodiment, once one or more processors are used to monitor the first associated party's attribute data, the first associated party's activities, and any special permissions granted to the first associated party within the organization at MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 217, process flow proceeds to IDENTIFY A NEED TO MODIFY THE FIRST ASSOCIATED PARTY PERMISSIONS OPERATION 219.

In accordance with one embodiment, at IDENTIFY A NEED TO MODIFY THE FIRST ASSOCIATED PARTY PERMISSIONS OPERATION 219 one or more processors are used to identify a need to modify the first associated party permissions represented by the approved first associated party permissions data based, at least in part, on the monitoring of the first associated party's attribute data, the first associated party's activities, and any special permissions granted to the first associated party within the organization.

As discussed above with respect to FIG. 1, in accordance with one embodiment, at IDENTIFY A NEED TO MODIFY THE FIRST ASSOCIATED PARTY PERMISSIONS OPERATION 219 monitoring module 165 includes one or more processors used to identify a need to modify the first associated party permissions represented by the approved first associated party permissions data 161 based, at least in part, on the monitoring of the first associated party's attribute data 150, the first associated party activity data 167, and special permission data 169 representing any special permissions granted to the first associated party within the organization.

Continuing with the specific illustrative example above, in an organization that is an accounting firm, a first associated party may be limited to accessing only data associated with a specific client by that first associated party's approved first associated party permissions data. However, it may be that the first associated party has been given approval, i.e., a special permission, to access other client's data a threshold number of times. Therefore, a determination is made that a need to modify the first associated party's permissions represented by the approved first associated party permissions data exists.

In accordance with one embodiment, once one or more processors are used to identify a need to modify the first associated party permissions represented by the approved first associated party permissions data based, at least in part, on the monitoring of the first associated party's attribute data, the first associated party's activities, and any special permissions granted to the first associated party within the organization at IDENTIFY A NEED TO MODIFY THE FIRST ASSOCIATED PARTY PERMISSIONS OPERATION 219, process flow proceeds to GENERATE PROPOSED MODIFIED FIRST ASSOCIATED PARTY PERMISSIONS DATA OPERATION 221.

In one embodiment, in response to an identified need to modify the first associated party permissions of IDENTIFY A NEED TO MODIFY THE FIRST ASSOCIATED PARTY PERMISSIONS OPERATION 219, at GENERATE PROPOSED MODIFIED FIRST ASSOCIATED PARTY PERMISSIONS DATA OPERATION 221 one or more processors are used to analyze and process the first associated party attribute data and the associated parties permissions to associated parties attributes correlation data to generate modified proposed first associated party permissions data representing proposed modified first associated party permissions proposed to be granted to the first associated party.

In one embodiment, once proposed modified first associated party permissions data is generated at GENERATE PROPOSED MODIFIED FIRST ASSOCIATED PARTY PERMISSIONS DATA OPERATION 221, process flow proceeds to PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 223.

In one embodiment, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 223 one or more processors are used to provide the proposed modified first associated party permissions data to one or more designated decision makers within the organization for approval.

In one embodiment, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 223 one or more processors are used to receive approval data representing approval of the proposed modified first associated party permissions data from the one or more designated decision makers within the organization.

In one embodiment, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 223 one or more processors are used to transform the status of the proposed modified first associated party permissions data from "proposed modified" first associated party permissions data to "approved" first associated party permissions data.

In one embodiment, once one or more processors are used to provide the proposed modified first associated party permissions data to one or more designated decision makers within the organization for approval, and approval data is received, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 223, process flow proceeds to ENFORCE THE FIRST ASSOCIATED PARTY PERMISSIONS REPRESENTED BY THE APPROVED FIRST ASSOCIATED PARTY PERMISSIONS DATA OPERATION 225.

In one embodiment, at ENFORCE THE FIRST ASSOCIATED PARTY PERMISSIONS REPRESENTED BY THE APPROVED FIRST ASSOCIATED PARTY PERMISSIONS DATA OPERATION 225 one or more processors are used to integrate the approved modified first associated party permissions data into the first associated party attribute data to update the first associated party attribute data of OBTAIN FIRST ASSOCIATED PARTY ATTRIBUTE DATA OPERATION 209 and process flow proceeds back to MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 217 where one or more processors are used to continue to monitor the first associated party's attribute data, the first associated party's activities, and any special permissions granted to the first associated party within the organization in order to identify further need to modify the first associated party permissions.

Figure 3:
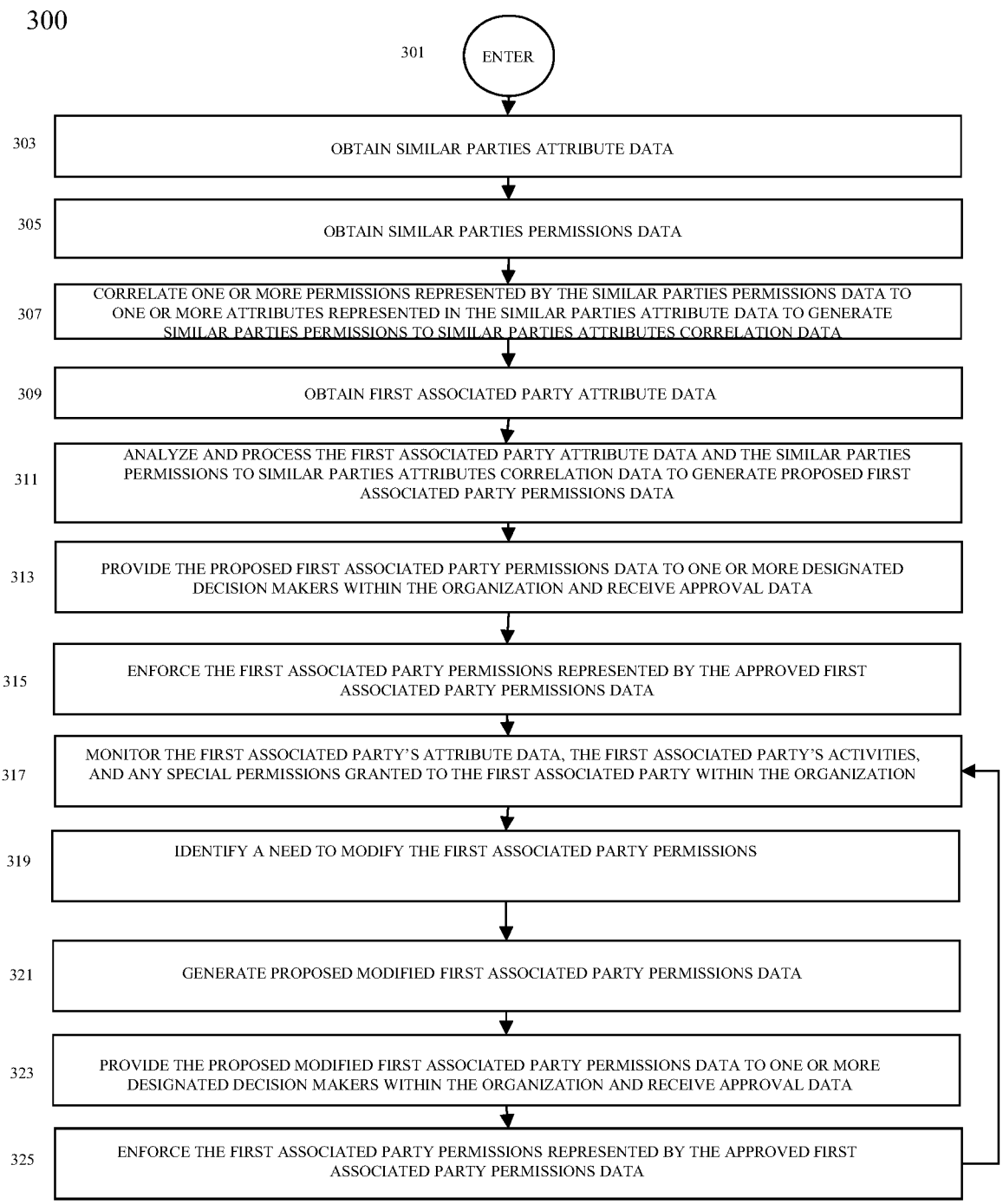
FIG. 3 is an illustrative flow chart for implementing a method and system for granting permissions to parties within an organization in accordance with one embodiment.

Moving on to FIG. 3, FIG. 3 is an illustrative flow chart for implementing a process 300 for granting permissions to parties within an organization in accordance with one embodiment. Referring to FIGS. 1 and 3 together, process 300 begins at ENTER OPERATION 301 and process flow proceeds to OBTAIN SIMILAR PARTIES ATTRIBUTE DATA OPERATION 303.

In accordance with one embodiment, at OBTAIN SIMILAR PARTIES ATTRIBUTE DATA OPERATION 303 one or more processors are used to obtain or generate similar parties attribute data representing attributes of similar parties currently or historically associated with one or more similar organizations that are distinct from the organization but that are determined to be similarly situated with respect to the organization.

As discussed above with respect to FIG. 1, in accordance with one embodiment, similar parties data acquisition module 143 is used to obtain or generate similar parties attribute data 145 representing attributes of similar parties currently or historically associated with one or more similar organizations that are distinct from the organization but that are determined to be similarly situated with respect to the organization.

In accordance with one embodiment, the similar parties of OBTAIN SIMILAR PARTIES ATTRIBUTE DATA OPERATION 303 are identified by the organization. In accordance with one embodiment, the similar parties of OBTAIN SIMILAR PARTIES ATTRIBUTE DATA OPERATION 303 are identified by a third party, service, or organization.

In accordance with one embodiment, the similar parties of OBTAIN SIMILAR PARTIES ATTRIBUTE DATA OPERATION 303 are identified based on the similarity of any data associated with the associated parties and similar parties deemed to be relevant, and/or any other similarities or factors as discussed above with respect to FIG. 1, or as otherwise discussed herein, and/or as known in the art at the time of filing, and/or as become known after the time of filing.

In accordance with one embodiment, the similar organizations of OBTAIN SIMILAR PARTIES ATTRIBUTE DATA OPERATION 303 are identified by the organization. In accordance with one embodiment, the similar organizations of OBTAIN SIMILAR PARTIES ATTRIBUTE DATA OPERATION 303 are identified by a third party, service, or organization.

In accordance with one embodiment, the similar organizations of OBTAIN SIMILAR PARTIES ATTRIBUTE DATA OPERATION 303 are identified based on any similarities or factors as discussed above with respect to FIG. 1, or as otherwise discussed herein, and/or as known in the art at the time of filing, and/or as become known after the time of filing.

In accordance with one embodiment, once one or more processors are used to obtain or generate similar parties attribute data representing attributes of similar parties currently or historically associated with one or more similar organizations that are distinct from the organization but that are determined to be similarly situated with respect to the organization at OBTAIN SIMILAR PARTIES ATTRIBUTE DATA OPERATION 303, process flow proceeds to OBTAIN SIMILAR PARTIES PERMISSIONS DATA OPERATION 305.

In accordance with one embodiment, at OBTAIN SIMILAR PARTIES PERMISSIONS DATA OPERATION 305 one or more processors are used to obtain or generate similar parties permissions data representing permissions granted to the similar parties currently or historically associated with the one or more similar organizations.

As discussed above with respect to FIG. 1, in accordance with one embodiment, similar parties data acquisition module 143 is used to obtain or generate similar parties permissions data 147 representing permissions granted to the similar parties currently or historically associated with the one or more similar organizations.

In accordance with one embodiment, once one or more processors are used to obtain or generate similar parties permissions data representing permissions granted to the similar parties currently or historically associated with the one or more similar organizations at OBTAIN SIMILAR PARTIES PERMISSIONS DATA OPERATION 305, process flow proceeds to CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 307.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 307 one or more processors are used to correlate one or more permissions represented by the similar parties permissions data to one or more attributes represented in the similar parties attribute data.

As discussed above with respect to FIG. 1, in accordance with one embodiment, similar parties correlation module 148 is used to correlate one or more permissions represented by the similar parties permissions data 147 to one or more attributes represented in the similar parties attribute data 145. In accordance with one embodiment, similar parties correlation module 148 is used to generate similar parties permissions to similar parties attributes correlation data 149 representing the correlation of the one or more similar parties permissions to the one or more similar parties attributes.

As also discussed above, in accordance with one embodiment, similar parties correlation module 148 includes one or more processors used to implement one or more algorithms used to weight, rank, or otherwise process, the similar parties permissions to similar parties attributes correlation data 149. In accordance with one embodiment, similar parties correlation module 148 includes one or more processors used to implement one or more algorithms used to weight, rank, or otherwise process, the similar parties permissions to similar parties attributes correlation data 149 based on the similarity between the organization and the similar organization. In accordance with one embodiment, similar parties correlation module 148 includes one or more processors used to implement one or more algorithms used to weight, rank, or otherwise process, the similar parties permissions to similar parties attributes correlation data 149 based on the similarity between the associated parties and the similar parties, as discussed herein, and/or as known in the art at the time of filing, and/or as developed after the time of filing.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 307 one or more processors are used to implement one or more algorithms used to weight the similar parties permissions to similar parties attributes correlation data.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 307 one or more processors are used to implement one or more algorithms used to weight the similar parties permissions to similar parties attributes correlation data based on the similarity between the organization and the similar organization.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 307 one or more processors are used to implement one or more algorithms used to weight the similar parties permissions to similar parties attributes correlation data based on the similarity between the associated parties and the similar parties.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 307 one or more processors are used to implement one or more algorithms used to weight the similar parties permissions to similar parties attributes correlation data based, at least in part, on one or more of the level of similarity of any data associated with the associated parties and similar parties deemed to be relevant, and/or level of any other similarities or factors as discussed above with respect to FIG. 1, or as otherwise discussed herein, and/or as known in the art at the time of filing, and/or as become known after the time of filing in accordance with the desires, preferences, and risk tolerance of the organization.

In accordance with one embodiment, the organization, and/or similar organizations, are businesses and the associated parties, and/or similar parties, are employees of the businesses.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 307 one or more processors are used to generate similar parties permissions to similar parties attributes correlation data representing the correlation of the one or more similar parties permissions to the one or more similar parties attributes.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 307 one or more processors are used to store the similar parties permissions to similar parties attributes correlation data in a similar parties permissions to similar parties attributes correlation data section of a memory.

In accordance with one embodiment, similar parties correlation module 148 is used to correlate one or more permissions represented by the similar parties permissions data 147 to one or more attributes represented in the similar parties attribute data 145. In accordance with one embodiment, similar parties correlation module 148 is used to generate similar parties permissions to similar parties attributes correlation data 149 representing the correlation of the one or more similar parties permissions to the one or more similar parties attributes.

In accordance with one embodiment, once one or more processors are used to correlate one or more permissions represented by the similar parties permissions data to one or more attributes represented in the similar parties attribute data at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 307, process flow proceeds to OBTAIN FIRST ASSOCIATED PARTY ATTRIBUTE DATA OPERATION 309.

In accordance with one embodiment, at OBTAIN FIRST ASSOCIATED PARTY ATTRIBUTE DATA OPERATION 309 one or more processors are used to obtain or generate first associated party attribute data representing attributes of a first associated party associated with the organization.

In accordance with one embodiment, the organization, and/or similar organizations, are businesses and the associated parties, and/or similar parties, are employees of the businesses, and the first associated party is a new employee or contractor of the business.

As discussed above with respect to FIG. 1, in accordance with one embodiment, once one or more processors are used to obtain or generate first associated party attribute data representing attributes of a first associated party associated with the organization at OBTAIN FIRST ASSOCIATED PARTY ATTRIBUTE DATA OPERATION 309, process flow proceeds to ANALYZE AND PROCESS THE FIRST ASSOCIATED PARTY ATTRIBUTE DATA AND THE SIMILAR PARTIES PERMISSIONS TO SIMILAR PARTIES ATTRIBUTES CORRELATION DATA TO GENERATE PROPOSED FIRST ASSOCIATED PARTY PERMISSIONS DATA OPERATION 311.

In accordance with one embodiment, at ANALYZE AND PROCESS THE FIRST ASSOCIATED PARTY ATTRIBUTE DATA AND THE SIMILAR PARTIES PERMISSIONS TO SIMILAR PARTIES ATTRIBUTES CORRELATION DATA TO GENERATE PROPOSED FIRST ASSOCIATED PARTY PERMISSIONS DATA OPERATION 311 one or more processors are used to analyze and process the first associated party attribute data and the similar parties permissions to similar parties attributes correlation data to generate proposed first associated party permissions data representing proposed first associated party permissions proposed to be granted to the first associated party.

As discussed above with respect to FIG. 1, in accordance with one embodiment, analysis module 153 is used to analyze and process the first associated party attribute data 150 and the similar parties permissions to similar parties attributes correlation data 149 to generate proposed first associated party permissions data 155 representing proposed first associated party permissions proposed to be granted to the first associated party of the first associated party attribute data 150.

In various embodiments, at ANALYZE AND PROCESS THE FIRST ASSOCIATED PARTY ATTRIBUTE DATA AND THE SIMILAR PARTIES PERMISSIONS TO SIMILAR PARTIES ATTRIBUTES CORRELATION DATA TO GENERATE PROPOSED FIRST ASSOCIATED PARTY PERMISSIONS DATA OPERATION 311 one or more processors are used to weight and process the first associated party attribute data and the similar parties permissions to similar parties attributes correlation data to generate proposed first associated party permissions data representing proposed first associated party permissions proposed to be granted to the first associated party using any of the methods and procedures discussed above with respect to FIG. 1, or as discussed elsewhere herein.

In accordance with one embodiment, once one or more processors are used to analyze and process the first associated party attribute data and the similar parties permissions to similar parties attributes correlation data to generate proposed first associated party permissions data representing proposed first associated party permissions proposed to be granted to the first associated party at ANALYZE AND PROCESS THE FIRST ASSOCIATED PARTY ATTRIBUTE DATA AND THE SIMILAR PARTIES PERMISSIONS TO SIMILAR PARTIES ATTRIBUTES CORRELATION DATA TO GENERATE PROPOSED FIRST ASSOCIATED PARTY PERMISSIONS DATA OPERATION 311, process flow proceeds to PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 313.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 313 one or more processors are used to provide the proposed first associated party permissions data to one or more designated decision makers within the organization for approval.

In accordance with various embodiments, the designated decision makers of PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 313 are any parties, systems, or other entities, as discussed herein, and/or as known in the art at the time of filing, and/or as become known after the time of filing.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 313 one or more processors are used to receive approval data representing approval of the proposed first associated party permissions data from the one or more designated decision makers within the organization.

In accordance with one embodiment, data transfer module 157 is used to provide the proposed first associated party permissions data 155 to one or more designated decision makers within the organization for approval (not shown).

As discussed above with respect to FIG. 1, in accordance with one embodiment, data transfer module 157 is used to receive approval data 159 representing approval of the proposed first associated party permissions data 155 from the one or more designated decision makers within the organization.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 313 one or more processors are used to transform the status of the proposed first associated party permissions data from "proposed" first associated party permissions data to "approved" first associated party permissions data.

As discussed above with respect to FIG. 1, in accordance with one embodiment, status transformation module 160 is used to transform the status of the "proposed" first associated party permissions data 155 to "approved" first associated party permissions data 161.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 313 one or more processors are used to integrate the approved first associated party permissions data into the first associated party attribute data to update the first associated party attribute data.

As discussed above with respect to FIG. 1, in accordance with one embodiment, status transformation module 160 is used to integrate the approved first associated party permissions data 161 into the first associated party attribute data 150 to update the first associated party attribute data 150.

In accordance with one embodiment, once one or more processors are used to receive approval data representing approval of the proposed first associated party permissions data from the one or more designated decision makers within the organization at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 313, process flow proceeds to ENFORCE THE FIRST ASSOCIATED PARTY PERMISSIONS REPRESENTED BY THE APPROVED FIRST ASSOCIATED PARTY PERMISSIONS DATA OPERATION 315.

In accordance with one embodiment, at ENFORCE THE FIRST ASSOCIATED PARTY PERMISSIONS REPRESENTED BY THE APPROVED FIRST ASSOCIATED PARTY PERMISSIONS DATA OPERATION 315 one or more processors are used to enforce the first associated party permissions represented by the approved first associated party permissions data.

In accordance with one embodiment, at ENFORCE THE FIRST ASSOCIATED PARTY PERMISSIONS REPRESENTED BY THE APPROVED FIRST ASSOCIATED PARTY PERMISSIONS DATA OPERATION 315 the first associated party permissions represented by the approved first associated party permissions data are enforced by using one or more processors to monitor the activities of the first associated party and blocking or allowing access and activities of the first associated party based on the approved first associated party permissions represented by the approved first associated party permissions data.

As discussed above with respect to FIG. 1, in accordance with one embodiment, enforcement module 163 is used to enforce the first associated party permissions represented by the approved first associated party permissions data 161.

In accordance with one embodiment, once one or more processors are used to enforce the first associated party permissions represented by the approved first associated party permissions data at ENFORCE THE FIRST ASSOCIATED PARTY PERMISSIONS REPRESENTED BY THE APPROVED FIRST ASSOCIATED PARTY PERMISSIONS DATA OPERATION 315, process flow proceeds to MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 317.

In accordance with one embodiment, at MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 317 one or more processors are used to monitor the first associated party's attribute data, the first associated party's activities, and any special permissions granted to the first associated party within the organization.

In one embodiment, data representing the blocking or allowing of access and activities of the first associated party based on the approved first associated party permissions represented by the approved first associated party permissions data, and any special permissions or approvals granted to the first associated party is obtained and stored.

As discussed above with respect to FIG. 1, in accordance with one embodiment, the first associated party permissions represented by the approved first associated party permissions data 161 are enforced by using enforcement module 163 and monitoring module 165 to monitor the activities of the first associated party and blocking or allowing access and activities of the first associated party based on the approved first associated party permissions represented by the approved first associated party permissions data 161. In one embodiment, first associated party activity data 167, representing the allowed, blocked, and specially permitted access and activities of the first associated party, is obtained and stored.

In accordance with one embodiment, monitoring module 165 is used to monitor the first associated party's attribute data 150, the first associated party's activities data 167, and special permission data 169 representing any special permissions granted to the first associated party within the organization.

In accordance with one embodiment, the special permissions granted to the first associated party within the organization of MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 317 include, but are not limited to, instances where the first associated party is granted permissions not included in, or within the limits of, the approved first associated party permissions represented by the approved first associated party permissions data.

As noted above, special permissions include the approval of rights or capabilities that are beyond or exceed the rights, limits, or capabilities currently granted/used to control and monitor the types of activities in which a given "party" associated with an "organization" engages as defined by the approved first associated party permissions data.

Some specific examples of special permissions that can be granted a given party in an organization include, but are not limited to: one time or case-by-case approvals, and/or allowance, and/or waiver of limits and/or access to data and types of data; one time or case-by-case approvals, and/or allowance, and/or waiver of limits on a capability to perform various actions or tasks within the organization and/or access to the data and applications used by the organization; one time or case-by-case approvals, and/or allowance, and/or waiver of review required for any tasks and actions taken by the party; one time or case-by-case approvals, and/or allowance, and/or waiver of limits on the capability to act as an agent for the organization, and incur debt, pay bills, sign agreements or otherwise represent the organization; one time or case-by-case approvals, and/or allowance, and/or waiver of spending and transaction limits imposed on the party; one time or case-by-case approvals, and/or allowance, and/or waiver of restriction on the types of work the party can perform; one time or case-by-case approvals, and/or allowance, and/or waiver of restrictions on the types of clients the party can service or interact with; one time or case-by-case approvals, and/or allowance, and/or waiver of restrictions on specific clients to which the party is provided access; one time or case-by-case approvals, and/or allowance, and/or waiver of restrictions on the level of independence of operation afforded to the party; and/or any other one time or case-by-case approval, and/or allowance, and/or waiver of the numerous forms of permissions assigned to a given party within an organization so that the activities of the party can be controlled and monitored.

As a specific illustrative example of a special permission, a party in an organization may be limited to making changes to only specific organizational programs or data by that party's approved first associated party permissions data. However, it may occur that on a case-by-case basis the party has been given approval, i.e., a special permission, to change other data and/or programs and, in one embodiment, this special permission was approved and/or provided by a supervisor. In one embodiment, data representing this special permission is identified and obtained as part of that party's first associated party activity data and stored as part of that party's special permission data at MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 317.

In various embodiments, any other forms of special permissions, as discussed herein, and/or as known in the art at the time of filing, and/or as become known after the time of filing are identified and obtained as part of the first associated party activity data and stored as part of the special permission data at MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 317.

In accordance with one embodiment, once one or more processors are used to monitor the first associated party's attribute data, the first associated party's activities, and any special permissions granted to the first associated party within the organization at MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 317, process flow proceeds to IDENTIFY A NEED TO MODIFY THE FIRST ASSOCIATED PARTY PERMISSIONS OPERATION 319.

In accordance with one embodiment, at IDENTIFY A NEED TO MODIFY THE FIRST ASSOCIATED PARTY PERMISSIONS OPERATION 319 one or more processors are used to identify a need to modify the first associated party permissions represented by the approved first associated party permissions data based, at least in part, on the monitoring of the first associated party's attribute data, the first associated party's activities, and any special permissions granted to the first associated party within the organization of MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 317.

As discussed above with respect to FIG. 1, in accordance with one embodiment, monitoring module 165 includes one or more processors used to identify a need to modify the first associated party permissions represented by the approved first associated party permissions data 161 based, at least in part, on the monitoring of the first associated party's attribute data 150, the first associated party activity data 167, and special permission data 169 representing any special permissions granted to the first associated party within the organization.

As a specific illustrative example, if a party in an organization is limited to making changes to only specific organizational programs or data by that party's approved first associated party permissions data and the party has been given approval, i.e., a special permission, to change other data and/or programs a threshold number of times, then at IDENTIFY A NEED TO MODIFY THE FIRST ASSOCIATED PARTY PERMISSIONS OPERATION 319 a determination is made that a need exists to modify the first associated party permissions represented by the party's approved first associated party permissions data.

As discussed above with respect to FIG. 1, in one embodiment, in response to each identified need to modify the first associated party permissions, analysis module 153 is used to again analyze and process the first associated party attribute data 150 and one or more of the associated parties permissions to associated parties attributes correlation data 139 and the similar parties permissions to similar parties attributes correlation data 149 to generate modified proposed first associated party permissions data 155 representing proposed modified first associated party permissions proposed to be granted to the first associated party.

In accordance with one embodiment, once one or more processors are used to identify a need to modify the first associated party permissions represented by the approved first associated party permissions data based, at least in part, on the monitoring of the first associated party's attribute data, the first associated party's activities, and any special permissions granted to the first associated party within the organization at IDENTIFY A NEED TO MODIFY THE FIRST ASSOCIATED PARTY PERMISSIONS OPERATION 319, process flow proceeds to GENERATE PROPOSED MODIFIED FIRST ASSOCIATED PARTY PERMISSIONS DATA OPERATION 321.

In one embodiment, in response to an identified need to modify the first associated party permissions of IDENTIFY A NEED TO MODIFY THE FIRST ASSOCIATED PARTY PERMISSIONS OPERATION 319, at GENERATE PROPOSED MODIFIED FIRST ASSOCIATED PARTY PERMISSIONS DATA OPERATION 321, one or more processors are used to analyze and process the first associated party attribute data and the similar parties permissions to similar parties attributes correlation data to generate modified proposed first associated party permissions data representing proposed modified first associated party permissions proposed to be granted to the first associated party.

In one embodiment, once one or more processors are used to analyze and process the first associated party attribute data and the similar parties permissions to similar parties attributes correlation data to generate modified proposed first associated party permissions data representing proposed modified first associated party permissions proposed to be granted to the first associated party at GENERATE PROPOSED MODIFIED FIRST ASSOCIATED PARTY PERMISSIONS DATA OPERATION 321, process flow proceeds to PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 323.

In one embodiment, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 323 one or more processors are used to provide the proposed modified first associated party permissions data to one or more designated decision makers within the organization for approval.

In one embodiment, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 323 one or more processors are used to receive approval data representing approval of the proposed modified first associated party permissions data from the one or more designated decision makers within the organization.

In one embodiment, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 323 one or more processors are used to transform the status of the proposed modified first associated party permissions data from "proposed modified" first associated party permissions data to "approved" first associated party permissions data.

In one embodiment, once one or more processors are used to provide the proposed modified first associated party permissions data to one or more designated decision makers within the organization for approval, and approval data is received, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 323, process flow proceeds to ENFORCE THE FIRST ASSOCIATED PARTY PERMISSIONS REPRESENTED BY THE APPROVED FIRST ASSOCIATED PARTY PERMISSIONS DATA OPERATION 325.

In one embodiment, at ENFORCE THE FIRST ASSOCIATED PARTY PERMISSIONS REPRESENTED BY THE APPROVED FIRST ASSOCIATED PARTY PERMISSIONS DATA OPERATION 325 one or more processors are used to integrate the approved modified first associated party permissions data into the first associated party attribute data to update the first associated party attribute data of OBTAIN FIRST ASSOCIATED PARTY ATTRIBUTE DATA OPERATION 309 and process flow proceeds back to MONITOR THE FIRST ASSOCIATED PARTY'S ATTRI- BUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 317 where one or more processors are used to continue to monitor the first associated party's attribute data, the first associated party's activities, and any special permissions granted to the first associated party within the organization in order to identify further need to modify the first associated party permissions.

Figure 4:
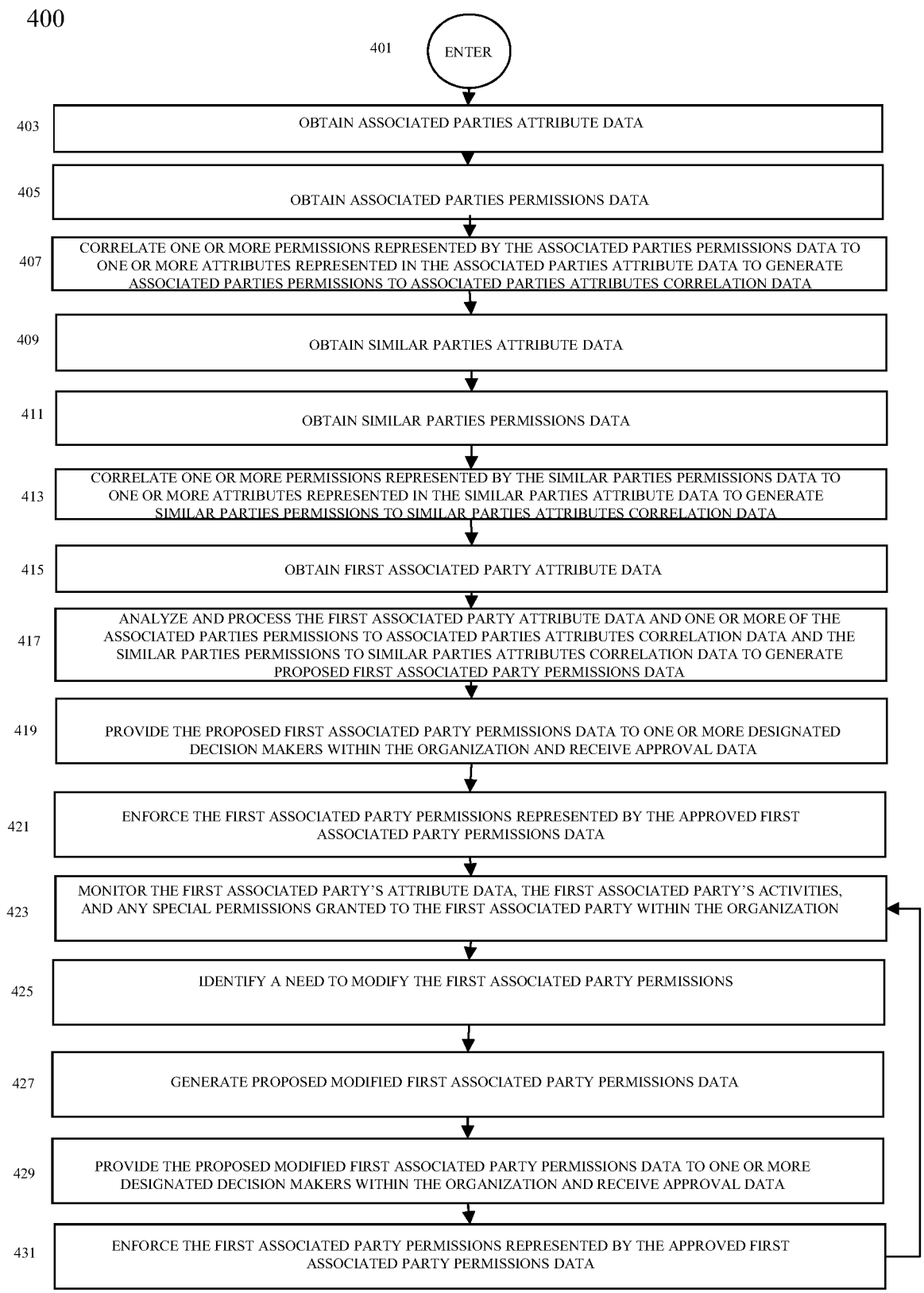
FIG. 4 is an illustrative flow chart for implementing a method and system for granting permissions to parties within an organization in accordance with one embodiment.

Moving on to FIG. 4, FIG. 4 is an illustrative flow chart for implementing a process 400 for granting permissions to parties within an organization in accordance with one embodiment. In one embodiment, process 400 represents a combination of elements of processes 200 and 300 discussed above with respect to FIGS. 2 and 3. Consequently, the relevant portions of the discussion above with respect to FIGS. 1, 2 and 3, are incorporated into the discussion below of process 400 and FIG. 4.

Referring to FIGS. 1 and 4 together, process 400 begins at ENTER OPERATION 401 and process flow proceeds to OBTAIN ASSOCIATED PARTIES ATTRIBUTE DATA OPERATION 403.

In accordance with one embodiment, at OBTAIN ASSOCIATED PARTIES ATTRIBUTE DATA OPERATION 403 one or more processors are used to obtain or generate associated parties attribute data representing attributes of associated parties currently or historically associated with an organization.

In accordance with one embodiment, the associated parties of the organization of OBTAIN ASSOCIATED PARTIES ATTRIBUTE DATA OPERATION 403 include, but are not limited to, any parties associated with an organization as discussed above with respect to FIG. 1, 2, or 3, and/or as otherwise discussed herein, and/or as known in the art at the time of filing, and/or as become known after the time of filing.

In accordance with one embodiment, the party attributes of OBTAIN ASSOCIATED PARTIES ATTRIBUTE DATA OPERATION 403 include, but are not limited to, any party attributes as discussed above with respect to FIG. 1, 2, or 3, and/or as otherwise discussed herein, and/or as known in the art at the time of filing, and/or as become known after the time of filing.

In accordance with one embodiment, once one or more processors are used to obtain or generate associated parties attribute data representing attributes of associated parties currently or historically associated with an organization at OBTAIN ASSOCIATED PARTIES ATTRIBUTE DATA OPERATION 403, process flow proceeds to OBTAIN ASSOCIATED PARTIES PERMISSIONS DATA OPERATION 405.

In one embodiment, at OBTAIN ASSOCIATED PARTIES PERMISSIONS DATA OPERATION 405 one or more processors are used to obtain or generate associated parties permissions data representing permissions granted to the associated parties currently or historically associated with the organization of OBTAIN ASSOCIATED PARTIES ATTRIBUTE DATA OPERATION 403.

In accordance with one embodiment, the party permissions of OBTAIN ASSOCIATED PARTIES PERMISSIONS DATA OPERATION 405 include, but are not limited to, any party permissions as discussed with respect to FIGS. 1, 2, and 3 above, as otherwise discussed herein, and/or as known in the art at the time of filing, and/or as become known after the time of filing.

In one embodiment, once one or more processors are used to obtain or generate associated parties permissions data representing permissions granted to the associated parties currently or historically associated with the organization at OBTAIN ASSOCIATED PARTIES PERMISSIONS DATA OPERATION 405, process flow proceeds to CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 407.

In accordance with one embodiment, at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 407 one or more processors are used to correlate one or more permissions represented by the associated parties permissions data to one or more attributes represented in the associated parties attribute data.

In accordance with one embodiment, at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 407 one or more processors are used to generate associated parties permissions to associated parties attributes correlation data representing the correlation of the one or more associated parties permissions to the one or more associated parties attributes.

In accordance with one embodiment, at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 407 one or more processors are used to implement one or more algorithms weight the associated parties permissions to associated parties attributes correlation data using any of the methods and/or procedures discussed above with respect to FIG. 1, 2, or 3, and/or as otherwise discussed herein, and/or as known in the art at the time of filing, and/or as become known after the time of filing.

In accordance with one embodiment, at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 407 one or more processors are used to store the associated parties permissions to associated parties attributes correlation data in an associated parties permissions to associated parties attributes correlation data section of a memory.

In accordance with one embodiment, once one or more processors are used to correlate one or more permissions represented by the associated parties permissions data to one or more attributes represented in the associated parties attribute data at CORRELATE ONE OR MORE PERMISSIONS REPRESENTED BY THE ASSOCIATED PARTIES PERMISSIONS DATA TO ONE OR MORE ATTRIBUTES REPRESENTED IN THE ASSOCIATED PARTIES ATTRIBUTE DATA TO GENERATE ASSOCIATED PARTIES PERMISSIONS TO ASSOCIATED PARTIES ATTRIBUTES CORRELATION DATA OPERATION 407, process flow proceeds to OBTAIN SIMILAR PARTIES ATTRIBUTE DATA OPERATION 409.

In accordance with one embodiment, at OBTAIN SIMILAR PARTIES ATTRIBUTE DATA OPERATION 409 one or more processors are used to obtain or generate similar parties attribute data representing attributes of similar parties currently or historically associated with one or more similar organizations that are distinct from the organization but that are determined to be similarly situated with respect to the organization.

In accordance with one embodiment, the similar parties of OBTAIN SIMILAR PARTIES ATTRIBUTE DATA OPERATION 409 are identified by the organization. In accordance with one embodiment, the similar parties of OBTAIN SIMILAR PARTIES ATTRIBUTE DATA OPERATION 409 are identified by a third party, service, or organization.

In accordance with one embodiment, the similar parties of OBTAIN SIMILAR PARTIES ATTRIBUTE DATA OPERATION 409 are identified based on any similarities or factors as above with respect to FIGS. 1 and 3, and/or as otherwise discussed herein, and/or as known in the art at the time of filing, and/or as become known after the time of filing.

In accordance with one embodiment, the similar organizations of OBTAIN SIMILAR PARTIES ATTRIBUTE DATA OPERATION 409 are identified by the organization. In accordance with one embodiment, the similar organizations of OBTAIN SIMILAR PARTIES ATTRIBUTE DATA OPERATION 409 are identified by a third party, service, or organization.

In accordance with one embodiment, the similar organizations of OBTAIN SIMILAR PARTIES ATTRIBUTE DATA OPERATION 409 are identified based on any similarities or factors as discussed with respect to FIG. 1, 2, or 3 above, as otherwise discussed herein, and/or as known in the art at the time of filing, and/or as become known after the time of filing.

In accordance with one embodiment, once one or more processors are used to obtain or generate similar parties attribute data representing attributes of similar parties currently or historically associated with one or more similar organizations that are distinct from the organization but that are determined to be similarly situated with respect to the organization at OBTAIN SIMILAR PARTIES ATTRIBUTE DATA OPERATION 409, process flow proceeds to OBTAIN SIMILAR PARTIES PERMISSIONS DATA OPERATION 411.

In accordance with one embodiment, at OBTAIN SIMILAR PARTIES PERMISSIONS DATA OPERATION 411 one or more processors are used to obtain or generate similar parties permissions data representing permissions granted to the similar parties currently or historically associated with the one or more similar organizations.

In accordance with one embodiment, once one or more processors are used to obtain or generate similar parties permissions data representing permissions granted to the similar parties currently or historically associated with the one or more similar organizations at OBTAIN SIMILAR PARTIES PERMISSIONS DATA OPERATION 411, process flow proceeds to CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 413.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 413 one or more processors are used to correlate one or more permissions represented by the similar parties permissions data to one or more attributes represented in the similar parties attribute data.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 413 one or more processors are used to implement one or more algorithms used to weight the similar parties permissions to similar parties attributes correlation data based, at least in part, on any level of similarity of data associated with the associated parties and similar parties deemed to be relevant; and/or level of any other similarities or factors as discussed above with respect to FIGS. 1 and 3, or as otherwise discussed herein, and/or as known in the art at the time of filing, and/or as become known after the time of filing in accordance with the desires, preferences, and risk tolerance of the organization.

In accordance with one embodiment, the organization, and/or similar organizations, are businesses and the associated parties, and/or similar parties, are employees of the businesses.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 413 one or more processors are used to generate similar parties permissions to similar parties attributes correlation data representing the correlation of the one or more similar parties permissions to the one or more similar parties attributes.

In accordance with one embodiment, at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 413 one or more processors are used to store the similar parties permissions to similar parties attributes correlation data in a similar parties permissions to similar parties attributes correlation data section of a memory.

In accordance with one embodiment, once one or more processors are used to correlate one or more permissions represented by the similar parties permissions data to one or more attributes represented in the similar parties attribute data at CORRELATE ONE OR MORE PERMISSIONS REPRESENTED BY THE SIMILAR PARTIES PERMISSIONS DATA TO ONE OR MORE ATTRIBUTES REPRESENTED IN THE SIMILAR PARTIES ATTRIBUTE DATA TO GENERATE SIMILAR PARTIES PERMISSIONS TO SIMILAR PARTIES ATTRIBUTES CORRELATION DATA OPERATION 413, process flow proceeds to OBTAIN FIRST ASSOCIATED PARTY ATTRIBUTE DATA OPERATION 415.

In accordance with one embodiment, at OBTAIN FIRST ASSOCIATED PARTY ATTRIBUTE DATA OPERATION 415 one or more processors are used to obtain or generate first associated party attribute data representing attributes of a first associated party associated with the organization.

In accordance with one embodiment, the organization, and/or similar organizations, are businesses and the associated parties, and/or similar parties, are employees of the businesses, and the first associated party is a new employee or contractor of the business.

In accordance with one embodiment, once one or more processors are used to obtain or generate first associated party attribute data representing attributes of a first associated party associated with the organization at OBTAIN FIRST ASSOCIATED PARTY ATTRIBUTE DATA OPERATION 415, process flow proceeds to ANALYZE AND PROCESS THE FIRST ASSOCIATED PARTY ATTRIBUTE DATA AND ONE OR MORE OF THE ASSOCIATED PARTIES PERMISSIONS TO ASSOCIATED PARTIES ATTRIBUTES CORRELATION DATA AND THE SIMILAR PARTIES PERMISSIONS TO SIMILAR PARTIES ATTRIBUTES CORRELATION DATA TO GENERATE PROPOSED FIRST ASSOCIATED PARTY PERMISSIONS DATA OPERATION 417.

In accordance with one embodiment, at ANALYZE AND PROCESS THE FIRST ASSOCIATED PARTY ATTRIBUTE DATA AND ONE OR MORE OF THE ASSOCIATED PARTIES PERMISSIONS TO ASSOCIATED PARTIES ATTRIBUTES CORRELATION DATA AND THE SIMILAR PARTIES PERMISSIONS TO SIMILAR PARTIES ATTRIBUTES CORRELATION DATA TO GENERATE PROPOSED FIRST ASSOCIATED PARTY PERMISSIONS DATA OPERATION 417 one or more processors are used to analyze and process the first associated party attribute data and one or more of the associated parties permissions to associated parties attributes correlation data and the similar parties permissions to similar parties attributes correlation data to generate proposed first associated party permissions data representing proposed first associated party permissions proposed to be granted to the first associated party.

In accordance with one embodiment, one or more processors are used to weight and/or otherwise process the first associated party attribute data and one or more of the associated parties permissions to associated parties attributes correlation data and the similar parties permissions to similar parties attributes correlation data using any of the methods and/or procedures discussed above with respect to FIG. 1, 2, or 3, and/or as otherwise discussed herein, and/or as known in the art at the time of filing, and/or as become known after the time of filing In accordance with one embodiment, once one or more processors are used to analyze and process the first associated party attribute data and one or more of the associated parties permissions to associated parties attributes correlation data and the similar parties permissions to similar parties attributes correlation data to generate proposed first associated party permissions data representing proposed first associated party permissions proposed to be granted to the first associated party at ANALYZE AND PROCESS THE FIRST ASSOCIATED PARTY ATTRIBUTE DATA AND ONE OR MORE OF THE ASSOCIATED PARTIES PERMISSIONS TO ASSOCIATED PARTIES ATTRIBUTES CORRELATION DATA AND THE SIMILAR PARTIES PERMISSIONS TO SIMILAR PARTIES ATTRIBUTES CORRELATION DATA TO GENERATE PROPOSED FIRST ASSOCIATED PARTY PERMISSIONS DATA OPERATION 417, process flow proceeds to PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 419.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 419 one or more processors are used to provide the proposed first associated party permissions data to one or more designated decision makers within the organization for approval.

In accordance with various embodiments, the designated decision makers of PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 419 are any parties, systems, or other entities, as discussed with respect to FIGS. 1, 2, and 3 above, as otherwise discussed herein, and/or as known in the art at the time of filing, and/or as become known after the time of filing.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 419 one or more processors are used to receive approval data representing approval of the proposed first associated party permissions data from the one or more designated decision makers within the organization.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 419 one or more processors are used to transform the status of the proposed first associated party permissions data from "proposed" first associated party permissions data to "approved" first associated party permissions data.

In accordance with one embodiment, at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 419 one or more processors are used to integrate the approved first associated party permissions data into the first associated party attribute data to update the first associated party attribute data.

In accordance with one embodiment, once at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 419 one or more processors are used to provide the proposed first associated party permissions data to one or more designated decision makers within the organization for approval at PROVIDE THE PROPOSED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 419, process flow proceeds to ENFORCE THE FIRST ASSOCIATED PARTY PERMISSIONS REPRESENTED BY THE APPROVED FIRST ASSOCIATED PARTY PERMISSIONS DATA OPERATION 421.

In accordance with one embodiment, at ENFORCE THE FIRST ASSOCIATED PARTY PERMISSIONS REPRESENTED BY THE APPROVED FIRST ASSOCIATED PARTY PERMISSIONS DATA OPERATION 421 one or more processors are used to enforce the first associated party permissions represented by the approved first associated party permissions data.

In accordance with one embodiment, at ENFORCE THE FIRST ASSOCIATED PARTY PERMISSIONS REPRESENTED BY THE APPROVED FIRST ASSOCIATED PARTY PERMISSIONS DATA OPERATION 421 the first associated party permissions represented by the approved first associated party permissions data are enforced by using one or more processors to monitor the activities of the first associated party and blocking or allowing access and activities of the first associated party based on the approved first associated party permissions represented by the approved first associated party permissions data.

In accordance with one embodiment, the first associated party permissions represented by the approved first associated party permissions data are enforced using any of the methods and/or procedures discussed above with respect to FIG. 1, 2, or 3, and/or as otherwise discussed herein, and/or as known in the art at the time of filing, and/or as become known after the time of filing In accordance with one embodiment, once one or more processors are used to enforce the first associated party permissions represented by the approved first associated party permissions data at ENFORCE THE FIRST ASSOCIATED PARTY PERMISSIONS REPRESENTED BY THE APPROVED FIRST ASSOCIATED PARTY PERMISSIONS DATA OPERATION 421, process flow proceeds to MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 423.

In accordance with one embodiment, at MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 423 one or more processors are used to monitor the first associated party's attribute data, the first associated party's activities, and any special permissions granted to the first associated party within the organization.

In one embodiment, data representing the blocking or allowing of access and activities of the first associated party based on the approved first associated party permissions represented by the approved first associated party permissions data, and any special permissions or approvals granted to the first associated party is obtained and stored.

In accordance with one embodiment, the special permissions granted to the first associated party within the organization of MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 423 include, but are not limited to, any of the special permissions discussed above with respect to FIG. 1, 2, or 3, and/or as otherwise discussed herein, and/or as known in the art at the time of filing, and/or as become known after the time of filing.

In accordance with one embodiment, once one or more processors are used to monitor the first associated party's attribute data, the first associated party's activities, and any special permissions granted to the first associated party within the organization at MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 423, process flow proceeds to IDENTIFY A NEED TO MODIFY THE FIRST ASSOCIATED PARTY PERMISSIONS OPERATION 425.

In accordance with one embodiment, at IDENTIFY A NEED TO MODIFY THE FIRST ASSOCIATED PARTY PERMISSIONS OPERATION 425 one or more processors are used to identify a need to modify the first associated party permissions represented by the approved first associated party permissions data based, at least in part, on the monitoring of the first associated party's attribute data, the first associated party's activities, and any special permissions granted to the first associated party within the organization using any of the methods and/or procedures discussed above with respect to FIG. 1, 2, or 3, and/or as otherwise discussed herein, and/or as known in the art at the time of filing, and/or as become known after the time of filing.

In accordance with one embodiment, once one or more processors are used to identify a need to modify the first associated party permissions represented by the approved first associated party permissions data based, at least in part, on the monitoring of the first associated party's attribute data, the first associated party's activities, and any special permissions granted to the first associated party within the organization at IDENTIFY A NEED TO MODIFY THE FIRST ASSOCIATED PARTY PERMISSIONS OPERATION 425, process flow proceeds to GENERATE PROPOSED MODIFIED FIRST ASSOCIATED PARTY PERMISSIONS DATA OPERATION 427.

In one embodiment, in response to an identified need to modify the first associated party permissions of IDENTIFY A NEED TO MODIFY THE FIRST ASSOCIATED PARTY PERMISSIONS OPERATION 425, at GENERATE PROPOSED MODIFIED FIRST ASSOCIATED PARTY PERMISSIONS DATA OPERATION 427 one or more processors are used to analyze and process the first associated party attribute data and one or more of the associated parties permissions to associated parties attributes correlation data and the similar parties permissions to similar parties attributes correlation data to generate modified proposed first associated party permissions data representing proposed modified first associated party permissions proposed to be granted to the first associated party.

In one embodiment, once proposed modified first associated party permissions data is generated at GENERATE PROPOSED MODIFIED FIRST ASSOCIATED PARTY PERMISSIONS DATA OPERATION 427, process flow proceeds to PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 429.

In one embodiment, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 429 one or more processors are used to provide the proposed modified first associated party permissions data to one or more designated decision makers within the organization for approval.

In one embodiment, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 429 one or more processors are used to receive approval data representing approval of the proposed modified first associated party permissions data from the one or more designated decision makers within the organization.

In one embodiment, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 429 one or more processors are used to transform the status of the proposed modified first associated party permissions data from "proposed modified" first associated party permissions data to "approved" first associated party permissions data.

In one embodiment, once one or more processors are used to provide the proposed modified first associated party permissions data to one or more designated decision makers within the organization for approval, and approval data is received, at PROVIDE THE PROPOSED MODIFIED FIRST ASSOCIATED PARTY PERMISSIONS DATA TO ONE OR MORE DESIGNATED DECISION MAKERS WITHIN THE ORGANIZATION AND RECEIVE APPROVAL DATA OPERATION 429, process flow proceeds to ENFORCE THE FIRST ASSOCIATED PARTY PERMISSIONS REPRESENTED BY THE APPROVED FIRST ASSOCIATED PARTY PERMISSIONS DATA OPERATION 431.

In one embodiment, at ENFORCE THE FIRST ASSOCIATED PARTY PERMISSIONS REPRESENTED BY THE APPROVED FIRST ASSOCIATED PARTY PERMISSIONS DATA OPERATION 431 one or more processors are used to integrate the approved modified first associated party permissions data into the first associated party attribute data to update the first associated party attribute data of OBTAIN FIRST ASSOCIATED PARTY ATTRIBUTE DATA OPERATION 415 and process flow proceeds back to MONITOR THE FIRST ASSOCIATED PARTY'S ATTRIBUTE DATA, THE FIRST ASSOCIATED PARTY'S ACTIVITIES, AND ANY SPECIAL PERMISSIONS GRANTED TO THE FIRST ASSOCIATED PARTY WITHIN THE ORGANIZATION OPERATION 423 where one or more processors are used to continue to monitor the first associated party's attribute data, the first associated party's activities, and any special permissions granted to the first associated party within the organization in order to identify further need to modify the first associated party permissions.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining," "correlation," "analyzing," "providing," "enforcing," "monitoring," "generating," "enforcing," "defining," "determining," "calculating," "transforming," "correlating," "normalizing," "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method performed by one or more processors of a system, the method comprising:
    obtaining or generating attributes of associated parties currently or historically associated with an organization from a database of the system;
    obtaining or generating permissions granted to the associated parties from the database;
    correlating one or more of the permissions granted to the associated parties to one or more of the attributes of the associated parties;
    generating a first correlation of the one or more permissions granted to the associated parties to the one or more attributes of the associated parties;
    obtaining or generating attributes of similar parties currently or historically associated with one or more similar organizations that are distinct from, but determined to be similarly situated with respect to, the organization, from the database;
    obtaining or generating permissions granted to the similar parties from the database;
    correlating one or more of the permissions granted to the similar parties to one or more of the attributes of the similar parties;
    generating a second correlation of the one or more permissions granted to the similar parties to the one or more attributes of the similar parties;
    obtaining or generating attributes of a first associated party associated with the organization from the database;
    analyzing and processing the attributes of the first associated party and the first correlation and the second correlation to generate first associated party permissions;
    obtaining approval to integrate the first associated party permissions into the attributes of the first associated party;
    integrating the approved first associated party permissions into the attributes of the first associated party;
    monitoring the attributes of the first associated party, activities of the first associated party, and any special permissions granted to the first associated party;
    identifying a need to modify the approved first associated party permissions based, at least in part, on the monitoring of the attributes of the first associated party, the activities of the first associated party, and the special permissions granted to the first associated party; and
    for each identified need to modify the approved first associated party permissions:
        analyzing and processing the attributes of the first associated party and the first correlation and the second correlation to generate modified first associated party permissions;
        obtaining approval to integrate the modified first associated party permissions into the attributes of the first associated party;
        integrating the approved modified first associated party permissions into the attributes of the first associated party; and
        monitoring the attributes of the first associated party, the activities of the first associated party, and the special permissions granted to the first associated party.

2. The method of claim 1, wherein obtaining approval to integrate the first associated party permissions or the modified first associated party permissions into the attributes of the first associated party includes:
    providing the first associated party permissions or the modified first associated party permissions to one or more designated decision makers within the organization for approval;
    receiving approval of the first associated party permissions or the modified first associated party permissions from the one or more designated decision makers; and
    transforming a status of the first associated party permissions or the modified first associated party permissions from first associated party permissions or modified first associated party permissions to approved first associated party permissions or approved modified first associated party permissions.

3. The method of claim 2, wherein the designated decision makers are owners of resources controlled through the permissions granted.

4. The method of claim 2, wherein the designated decision makers are applications or computing systems.

5. The method of claim 2, wherein the designated decision makers are supervisors of the first associated party.

6. The method of claim 1, wherein the associated parties include one or more of:
- employees;
- contractors;
- volunteers;
- clients; and
- members.

7. The method of claim 1, wherein the party attributes include one or more of:
- how long the party has been associated with the organization;
- title of the party within the organization;
- job description for the party within the organization;
- experience of the party outside the organization;
- education or training level of the party;
- special skill sets associated with the party;
- evaluation and performance data associated with the party;
- salary of the party;
- trust scores or ratings associated with the party;
- evaluation data from a supervisor of the party; and
- data in an employee record associated with the party deemed relevant.

8. The method of claim 1, wherein the party permissions include one or more of:
- amounts of data to which the party is provided access;
- types of data to which the party is provided access;
- capability of the party to perform various actions or tasks within the organization;
- access to data management and other applications used by the organization;
- level of review required for various tasks and actions taken by the party;
- capability and limits placed on the party to act as an agent for the organization;
- capability and limits placed on the party to incur debt;
- capability and limits on the party to pay bills;
- capability and limits on the party to generate and sign agreements or otherwise represent the organization;
- spending, transaction, or requisition limits imposed on the party;
- types of work the party can perform;
- types of clients the party can service, access, or interact with;
- specific clients to which the party is provided access; and
- level of independence of operation afforded to the party.

9. The method of claim 1, wherein similar parties are identified based on similarity of one or more of the following:
- job descriptions of the associated parties and similar parties;
- titles of the associated parties and similar parties;
- locations of the associated parties and similar parties;
- salaries of the associated parties and similar parties;
- duration of employment of the associated parties and similar parties;
- experience of the associated parties and similar parties;
- education or training level of the associated parties and similar parties;
- special skill sets of the associated parties and similar parties; and
- data associated with the associated parties and similar parties deemed to be relevant.

10. The method of claim 1, wherein similar organizations are identified based on similarity of one or more of the following:
- function of the organization and similar organizations;
- service or goods provided by the organization and similar organizations;
- markets serviced by the organization and similar organizations;
- clients of the organization and similar organizations;
- revenue of the organization and similar organizations;
- number of associated parties of the organization and similar organizations;
- location of the organization and similar organizations; and
- number of locations of the organization and similar organizations.

11. The method of claim 1, wherein similar organizations are identified by the organization.

12. The method of claim 1, wherein similar parties are identified by the organization.

13. The method of claim 1, wherein the second correlation is weighted by one or more algorithms.

14. The method of claim 1, wherein the second correlation is weighted by one or more algorithms based on the similarity between the organization and the similar organization.

15. The method of claim 1, wherein the second correlation is weighted by one or more algorithms based on the similarity between the associated parties and the similar parties.

16. The method of claim 1, wherein the organizations are businesses and the parties are employees of the businesses.

17. The method of claim 1, further comprising:
monitoring the activities of the first associated party and blocking or allowing access and activities of the first associated party based on the approved first associated party permissions.

18. The method of claim 1, wherein the special permissions granted to the first associated party include instances where the first associated party is granted permissions not included in, or within the limits of, the approved first associated party permissions.

19. A method performed by one or more processors of a system, the method comprising:
obtaining or generating attributes of associated parties currently or historically associated with an organization from a database of the system;
obtaining or generating permissions granted to the associated parties from the database;
correlating one or more of the permissions granted to the associated parties to one or more of the attributes of the associated parties;
generating a correlation of the one or more permissions granted to the associated parties to the one or more attributes of the associated parties;
obtaining or generating attributes of a first associated party associated with the organization from the database;
analyzing and processing the attributes of the first associated party and the correlation to generate first associated party permissions;
approval of the first associated party permissions;
integrating the approved first associated party permissions into the attributes of the first associated party;
monitoring the attributes of the first associated party, activities of the first associated party, and any special permissions granted to the first associated party;
identifying a need to modify the approved first associated party permissions based, at least in part, on the monitoring of the attributes of the first associated party, the activities of the first associated party, and the special permissions granted to the first associated party; and for each identified need to modify the approved first associated party permissions:

analyzing and processing the attributes of the first associated party and the correlation to generate modified first associated party permissions;

approval of the modified first associated party permissions;

integrating the approved modified first associated party permissions into the attributes of the first associated party; and monitoring the attributes of the first associated party, the activities of the first associated party, and the special permissions granted to the first associated party.

20. The method of claim 19, wherein the associated parties include one or more of:

employees;
contractors;
volunteers;
clients; and
members.

21. The method of claim 19, wherein the party attributes include one or more of:

how long the party has been associated with the organization;
title of the party within the organization;
job description for the party within the organization;
experience of the party outside the organization;
education or training level of the party;
special skill sets associated with the party;
evaluation and performance data associated with the party;
salary of the party;
trust scores or ratings associated with the party;
evaluation data from a supervisor of the party; and
data in an employee record associated with the party deemed relevant.

22. The method of claim 19, wherein the party permissions include one or more of:

amounts of data to which the party is provided access;
types of data to which the party is provided access;
capability of the party to perform various actions or tasks within the organization;
access to data management and other applications used by the organization;
level of review required for various tasks and actions taken by the party;
capability and limits placed on the party to act as an agent for the organization;
capability and limits placed on the party to incur debt;
capability and limits on the party to pay bills;
capability and limits on the party to generate and sign agreements or otherwise represent the organization;
spending, transaction, or requisition limits imposed on the party;
types of work the party can perform;
types of clients the party can service, access, or interact with;
specific clients to which the party is provided access; and
level of independence of operation afforded to the party.

23. The method of claim 19, wherein the correlation is weighted by one or more algorithms.

24. The method of claim 19, wherein the organizations are businesses and the parties are employees of the businesses.

25. The method of claim 19, wherein the approval of the first associated party permissions is provided by designated decision makers that are owners of resources controlled through the permissions granted.

26. The method of claim 25, wherein the designated decision makers are applications or computing systems.

27. The method of claim 25, wherein the designated decision makers are supervisors of the first associated party.

28. The method of claim 19, further comprising:

monitoring the activities of the first associated party and blocking or allowing access and activities of the first associated party based on the approved first associated party permissions.

29. The method of claim 19, wherein the special permissions granted to the first associated party include instances where the first associated party is granted permissions not included in, or within the limits of, the approved first associated party permissions.

30. A method performed by one or more processors of a system, the method comprising:

obtaining or generating attributes of similar parties currently or historically associated with one or more similar organizations that are distinct from, but determined to be similarly situated with respect to, an organization, from a database of the system;

obtaining or generating permissions granted to the similar parties from the database;

correlating one or more of the permissions granted to the similar parties to one or more of the attributes of the similar parties;

generating a correlation of the one or more permissions granted to the similar parties to the one or more attributes of the similar parties;

obtaining or generating attributes of a first associated party associated with the organization from the database;

analyzing and processing the attributes of the first associated party and the correlation to generate first associated party permissions;

receiving approval of the first associated party permissions;

integrating the approved first associated party permissions into the attributes of the first associated party;

monitoring the attributes of the first associated party, activities of the first associated party, and any special permissions granted to the first associated party;

identifying a need to modify the approved first associated party permissions based, at least in part, on the monitoring of the attributes of the first associated party, the activities of the first associated party, and the special permissions granted to the first associated party; and for each identified need to modify the approved first associated party permissions:

analyzing and processing the attributes of the first associated party and the correlation to generate modified first associated party permissions;

receiving approval of the modified first associated party permissions;

integrating the approved modified first associated party permissions into the attributes of the first associated party; and monitoring the attributes of the first associated party, the activities of the first associated party, and the special permissions granted to the first associated party.

31. The method of claim 30, wherein the first associated party is one of:

an employee;
a contractor;
a volunteer;
a client; and
a member.

32. The method of claim 30, wherein the first associated party attributes include one or more of:
    how long the first associated party has been associated with the organization;
    title of the first associated party within the organization;
    job description for the first associated party within the organization;
    experience of the first associated party outside the organization;
    education or training level of the first associated party;
    special skill sets associated with the first associated party;
    evaluation and performance data associated with the first associated party;
    salary of the first associated party;
    trust scores or ratings associated with the first associated party;
    evaluation data from a supervisor of the first associated party; and
    data in an employee record associated with the first associated party deemed to be relevant.

33. The method of claim 30, wherein the party permissions include one or more of:
    amounts of data to which the party is provided access;
    types of data to which the party is provided access;
    capability of the party to perform various actions or tasks within the organization;
    access to data management and other applications used by the organization;
    level of review required for various tasks and actions taken by the party;
    capability and limits placed on the party to act as an agent for the organization;
    capability and limits placed on the party to incur debt;
    capability and limits on the party to pay bills;
    capability and limits on the party to generate and sign agreements or otherwise represent the organization;
    spending, transaction, or requisition limits imposed on the party;
    types of work the party can perform;
    types of clients the party can service, access, or interact with;
    specific clients to which the party is provided access; and
    level of independence of operation afforded to the party.

34. The method of claim 30, wherein similar parties are identified based on similarity of one or more of the following:
    job descriptions of the first associated party and similar parties;
    titles of the first associated party and similar parties;
    locations of the first associated party and similar parties;
    salaries of the first associated party and similar parties;
    duration of employment of the first associated party and similar parties;
    experience of the first associated party and similar parties;
    education or training level of the first associated party and similar parties;
    special skill sets of the first associated party and similar parties; and
    data associated with the first associated party and similar parties deemed to be relevant.

35. The method of claim 30, wherein similar organizations are identified based on similarity of one or more of the following:
    function of the organization and similar organizations;
    service or goods provided by the organization and similar organizations;
    markets serviced by the organization and similar organizations;
    clients of the organization and similar organizations;
    revenue of the organization and similar organizations;
    number of associated parties of the organization and similar organizations;
    location of the organization and similar organizations;
    number of locations of the organization and similar organizations; and
    tax structure of the organization and similar organizations.

36. The method of claim 30, wherein similar organizations are identified by the organization.

37. The method of claim 30, wherein similar parties are identified by the organization.

38. The method of claim 30, wherein the correlation is weighted by one or more algorithms.

39. The method of claim 30, wherein the correlation is weighted by one or more algorithms based on the similarity between the organization and the similar organization.

40. The method of claim 30, wherein the correlation is weighted by one or more algorithms based on the similarity between the associated parties and the similar parties.

41. The method of claim 30, wherein the organizations are businesses and the parties are employees of the businesses.

42. The method of claim 30, further comprising:
    monitoring the activities of the first associated party and blocking or allowing access and activities of the first associated party based on the approved first associated party permissions.

43. The method of claim 30, wherein the special permissions granted to the first associated party include instances where the first associated party is granted permissions not included in, or within the limits of, the approved first associated party permissions.

44. A method performed by one or more processors of a system, the method comprising:
    obtaining or generating attributes of associated parties currently or historically associated with an organization from a database of the system;
    obtaining or generating permissions granted to the associated parties from the database;
    correlating one or more of the permissions granted to the associated parties to one or more of the attributes of the associated parties;
    generating a first correlation of the one or more permissions granted to the associated parties to the one or more attributes of the associated parties;
    obtaining or generating attributes of similar parties currently or historically associated with one or more similar organizations that are distinct from, but determined to be similarly situated with respect to, the organization, from the database;
    obtaining or generating permissions granted to the similar parties from the database;
    correlating one or more of the permissions granted to the similar parties to one or more of the attributes of the similar parties;
    generating a second correlation of the one or more permissions granted to the similar parties to the one or more attributes of the similar parties;

obtaining or generating attributes of a first associated party associated with the organization from the database;

analyzing and processing the attributes of the first associated party and the first correlation and the second correlation to generate first associated party permissions;

receiving approval of the first associated party permissions; and integrating the approved first associated party permissions into the attributes of the first associated party.

45. A method performed by one or more processors of a system, the method comprising:

obtaining or generating attributes of associated parties currently or historically associated with an organization from a database of the system;

obtaining or generating permissions granted to the associated parties from the database;

correlating one or more of the permissions granted to the associated parties to one or more of the attributes of the associated parties;

generating a correlation of the one or more permissions granted to the associated parties to the one or more attributes of the associated parties;

obtaining or generating attributes of a first associated party associated with the organization from the database;

analyzing and processing the attributes of the first associated party and the correlation to generate first associated party permissions;

receiving approval of the first associated party permissions; and integrating the approved first associated party permissions into the attributes of the first associated party.

46. A method performed by one or more processors of a system, the method comprising:

obtaining or generating attributes of business employees currently or historically employed by a business from a database of the system;

obtaining or generating permissions granted to the business employees from the database;

correlating one or more of the permissions granted to the business employees to one or more of the attributes of the business employees;

generating a first correlation of the one or more permissions granted to the business employees to the one or more attributes of the business employees;

storing the first correlation in a first correlation section of a memory;

obtaining or generating attributes of a similar employee currently or historically associated with one or more similar businesses that are distinct from, but determined to be similarly situated with respect to, the business, from the database;

obtaining or generating permissions granted to the similar employees from the database;

correlating one or more of the permissions granted to the similar employee to one or more of the attributes of the similar employee;

generating a second correlation of the one or more permissions granted to the similar employee to the one or more attributes of the similar employee;

storing the second correlation in a second correlation section of a memory;

obtaining or generating attributes of a new employee employed by the business from the database;

analyzing and processing the attributes of the new employee and the first correlation and the second correlation to generate new employee permissions;

providing the new employee permissions to one or more designated decision makers within the business for approval;

receiving approval of the new employee permissions from the one or more designated decision makers within the business;

transforms g a status of the new employee permissions from new employee permissions to approved new employee permissions;

integrating the approved new employee permissions into the attributes of the new employee;

enforcing the approved new employee permissions;

monitoring the attributes of the new employee, activities of the new employee, and any special permissions granted to the new employee;

identifying a need to modify the approved new employee permissions based, at least in part, on the monitoring of the attributes of the new employee, the activities of the new employee, and the special permissions granted to the new employee; and for each identified need to modify the approved new employee permissions:

analyzing and processing the attributes of the new employee and the first correlation and the second correlation to generate modified new employee permissions;

providing the modified new employee permissions to one or more designated decision makers within the business for approval;

receiving approval of the modified new employee permissions from the one or more designated decision makers within the business;

transforming a status of the modified new employee permissions from modified new employee permissions to approved new employee permissions;

integrating the approved modified new employee permissions into the attributes of the new employee;

enforcing the approved new employee permissions; and monitoring the attributes of the new employee, the activities of the new employee, and the special permissions granted to the new employee.

* * * * *